(12) United States Patent
Hoshino et al.

(10) Patent No.: US 10,273,656 B2
(45) Date of Patent: Apr. 30, 2019

(54) WORKING MACHINE WITH HYDRAULICS

(71) Applicant: Hitachi Construction Machinery Co., Ltd., Taito-ku, Tokyo (JP)

(72) Inventors: Masatoshi Hoshino, Ibaraki (JP); Shinji Ishihara, Ibaraki (JP); Kentarou Itoga, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/553,395

(22) PCT Filed: Jun. 1, 2016

(86) PCT No.: PCT/JP2016/066167
§ 371 (c)(1),
(2) Date: Aug. 24, 2017

(87) PCT Pub. No.: WO2016/194941
PCT Pub. Date: Dec. 8, 2016

(65) Prior Publication Data
US 2018/0087241 A1    Mar. 29, 2018

(30) Foreign Application Priority Data

Jun. 5, 2015  (JP) ................................ 2015-115024

(51) Int. Cl.
*E02F 9/20*    (2006.01)
*B60K 6/485*   (2007.10)
(Continued)

(52) U.S. Cl.
CPC ............ *E02F 9/2075* (2013.01); *B60K 6/485* (2013.01); *B60L 11/12* (2013.01); *B60W 10/06* (2013.01);
(Continued)

(58) Field of Classification Search
None
See application file for complete search history.

(56) References Cited

U.S. PATENT DOCUMENTS

2003/0109969 A1* 6/2003 Yamaguchi ............ B60K 6/485
                                                                701/22
2005/0090366 A1* 4/2005 Namba ................... B60W 20/10
                                                                 477/7

FOREIGN PATENT DOCUMENTS

JP    2004-112998 A    4/2004
JP    2007-262978 A   10/2007
(Continued)

OTHER PUBLICATIONS

International Search Report (PCT/ISA/210) issued in PCT Application No. PCT/JP2016/066167 dated Aug. 23, 2016 with English translation (Four (4) pages).
(Continued)

*Primary Examiner* — Richard M Camby
(74) *Attorney, Agent, or Firm* — Crowell & Moring LLP

(57) ABSTRACT

The present invention includes a battery controller that calculates an electrical storage remaining amount of a battery, a charging/discharging request calculation part that calculates a charging/discharging request amount for keeping electric power outputted by the battery within a predetermined range based on the electrical storage remaining amount calculated, a target rotational speed calculation part that calculates a target rotational speed command value of a motor generator, and an inverter that controls the motor generator according to the target rotational speed command value calculated, and it is configured that at least one of the battery controller and the inverter calculates the actual charging/discharging amount of the battery, and that the target rotational speed calculation part calculates a target rotational speed correction value from difference between (Continued)

the charging/discharging request amount and the actual charging/discharging amount and corrects the target rotational speed command value.

8 Claims, 13 Drawing Sheets

(51) Int. Cl.
    *B60L 11/12*     (2006.01)
    *B60W 10/06*     (2006.01)
    *B60W 10/08*     (2006.01)
    *F02D 41/14*     (2006.01)
    *F02D 45/00*     (2006.01)
    *F02D 29/00*     (2006.01)
    *F02D 29/06*     (2006.01)
    *B60W 20/13*     (2016.01)
    *B60W 10/26*     (2006.01)
    *E02F 9/22*     (2006.01)
    *E02F 3/32*     (2006.01)

(52) U.S. Cl.
    CPC ............ *B60W 10/08* (2013.01); *B60W 10/26* (2013.01); *B60W 20/13* (2016.01); *E02F 9/20* (2013.01); *E02F 9/2004* (2013.01); *E02F 9/2066* (2013.01); *E02F 9/22* (2013.01); *F02D 29/00* (2013.01); *F02D 29/06* (2013.01); *F02D 41/14* (2013.01); *F02D 45/00* (2013.01); *B60W 2300/17* (2013.01); *B60W 2510/244* (2013.01); *B60W 2530/00* (2013.01); *B60W 2710/0677* (2013.01); *B60W 2710/08* (2013.01); *B60W 2710/081* (2013.01); *B60W 2710/244* (2013.01); *E02F 3/32* (2013.01); *Y02T 10/6226* (2013.01); *Y02T 10/6286* (2013.01); *Y02T 10/7005* (2013.01); *Y02T 10/7077* (2013.01)

(56) References Cited

FOREIGN PATENT DOCUMENTS

| JP | 2008-18786 A | 1/2008 |
|---|---|---|
| JP | 2008-49761 A | 3/2008 |
| JP | 4800514 B2 | 10/2011 |

OTHER PUBLICATIONS

Japanese-language Written Opinion (PCT/ISA/237) issued in PCT Application No. PCT/JP2016/066167 dated Aug. 23, 2016 (Six (6) pages).

\* cited by examiner

WORKING MACHINE WITH HYDRAULICS

TECHNICAL FIELD

The present invention relates to a working machine to which a hybrid system driving a hydraulic pump by an engine and a motor generator is applied.

BACKGROUND ART

In a working machine to which the hybrid system of this kind is applied, namely a so-called hybrid working machine, such technology is known that the power of an engine is assisted by powering operation of a motor generator using the electric power of an electrical storage device when the load of the hydraulic pump is large, and the electrical storage device is charged by regeneratively driving the motor generator by the engine.

Further, as one of the related art of the hybrid working machine, hybrid construction machinery is known which includes an engine control means that controls the power of an engine and a motor generation control means that controls the motion of a motor generator, in which the engine control means operates the engine with a droop characteristic in which the torque increases at a constant rate according to drop of the rotational speed, and the motor generation control means operates the motor generator with the rotational speed control which effects control so that the actual rotational speed agrees to a target rotational speed by giving the target rotational speed (refer to PATENT LITERATURE 1, for example).

In concrete terms, according to the hybrid construction machinery of this related art, it is configured that the motor generation control means gives a rotational speed corresponding to a region of low fuel efficiency and low exhaust in the operation characteristic (rotational speed-torque characteristic) of the engine to the motor generator as a target rotational speed, and operates mainly the motor generator by the rotational speed control. At this time, the engine generates the torque that corresponds to the controlled rotational speed according to the droop characteristic by the engine control means, and therefore, even when the load of the vehicle body may change, the rotational speed and the torque of the engine can be maintained constantly within a range of low fuel efficiency and low exhaust.

CITATION LIST

Patent Literature

PATENT LITERATURE 1: Japanese Patent No. 4800514

SUMMARY OF INVENTION

Technical Problem

However, although the droop characteristic is a convenient method for keeping the rotational speed of the engine generally constant and securing the required power and the injection amount of the fuel to each cylinder of the engine is reduced according to increase of the rotational speed of the engine, there is no strict correspondence relationship between the injection amount of the fuel and the torque of the engine. In general, in an engine, the fuel injection state, the combustion state, and the torque caused by the results of them disperse for each device forming an engine such as a cylinder of the engine or for each engine itself. Further, the torque changes also according to the operation condition of an engine such as the property of the fuel, the air temperature, the air pressure, and so on. Therefore, due to the dispersion of the torque, in the hybrid construction machinery of the related art disclosed in PATENT LITERATURE 1, such case occurs that the torque of the engine does not agree to the droop characteristic even when the rotational speed of the engine is controlled by the motor generator based on the droop characteristic.

For example, such case is assumed that the load of the hydraulic pump is constant, the electrical storage remaining amount (SOC) of the electrical storage device reduces, the target charging amount for charging the electrical storage device is calculated, and the rotational speed of the engine is reduced according to the droop characteristic so as to be capable of increasing the torque that corresponds to this calculated target charging amount. In this case, when the torque actually generated by the engine is larger than the torque that corresponds to the intrinsic droop characteristic, the motor generator is regeneratively driven in order to maintain the calculated target rotational speed, the energy generated by the shift of the torque is charged in the electrical storage device, and therefore a charging amount exceeding the target charging amount is charged in the electrical storage device. On the other hand, when the torque actually generated by the engine is smaller than the torque that corresponds to the intrinsic droop characteristic, regeneration of the energy by regenerative drive of the motor generator for maintaining the calculated target rotational speed drops, and therefore charging to the target charging amount cannot be effected. Further, in a similar manner, when the electrical storage remaining amount of the electrical storage device increases and the target discharging amount for discharging from the electrical storage device is calculated, discharging according to the target discharging amount is difficult. Furthermore, proper management of the electrical storage device becomes difficult such that charging and discharging occur when charging and discharging of the electrical storage device is not necessary in a state the electrical storage remaining amount of the electrical storage device is proper, charging is effected when discharging is necessary, discharging is effected when charging is necessary, and so on.

In contrast, for example, such case is assumed that the rotational speed of the engine is reduced according to the droop characteristic so that the torque of the engine can be increased according to increase of the load of the hydraulic pump. In this case, when the torque actually generated by the engine is larger than the torque that corresponds to the intrinsic droop characteristic, the motor generator is regeneratively driven in order to maintain the target rotational speed, the energy generated by the shift of the torque is charged in the electrical storage device, and unintended charging is effected which is caused by deviation from the intrinsic droop characteristic. On the other hand, when the torque actually generated by the engine is smaller than the torque that corresponds to the intrinsic droop characteristic, the motor generator effects powering drive in order to maintain the target rotational speed, and unintended discharging is effected which is caused by deviation from the intrinsic droop characteristic. In any event, when an assumed torque is not secured, since the target rotational speed is maintained by regenerative drive or powering drive of the motor generator, proper management of the electrical storage remaining amount becomes difficult.

Also, when the electrical storage remaining amount of the electrical storage device could not be properly managed, there was a problem, for example, that drop of the electrical storage remaining amount of the electrical storage device proceeded, powering drive by the motor generator became impossible, and sufficient workability could not be secured.

The present invention has been achieved in view of such circumstance of the related art, and its object is to provide a working machine enabling proper management of the electrical storage remaining amount of an electrical storage device.

Solution to Problem

In order to achieve the object, the present invention is featured to include an engine, a hydraulic pump that is driven by the engine, a hydraulic working unit that is driven by hydraulic oil discharged by the hydraulic pump, a motor generator that effects transmission of torque to/from the engine, an electrical storage device that transmits/receives electric power to/from the motor generator, and a controller that operates the engine with a droop characteristic in which torque of the engine increases at a predetermined inclination corresponding to drop of rotational speed of the engine, in which the controller includes an electrical storage remaining amount calculation part that calculates an electrical storage remaining amount of the electrical storage device, a charging/discharging request calculation part that calculates a charging/discharging request value for maintaining electric power outputted by the electrical storage device within a predetermined range based on the electrical storage remaining amount calculated by the electrical storage remaining amount calculation part, a target rotational speed calculation part that calculates a target rotational speed command value for the motor generator, and a motor generator control part that controls the motor generator according to the target rotational speed command value calculated by the target rotational speed calculation part, at least one of the electrical storage remaining amount calculation part and the motor generator control part calculates an actual charging/discharging value of the electrical storage device, and the target rotational speed calculation part calculates a target rotational speed correction value from difference between the charging/discharging request value and the actual charging/discharging value and corrects the target rotational speed command value.

Advantageous Effects of Invention

According to the working machine of the present invention, the electrical storage remaining amount of the electrical storage device can be properly managed, and sufficient workability can be secured. Further, the problems, configurations and effects other than those described above will be clarified by explanation of the embodiments below.

BRIEF DESCRIPTION OF DRAWINGS

FIGS. 7A and 7B are graphs for obtaining the target rotational speed from the target engine power in the vehicle body controller, in which FIG. 7A illustrates the relationship between the rotational speed and the torque, and FIG. 7B illustrates the relationship between the target engine power and the target rotational speed.

FIGS. 15A and 15B are graphs showing a time series of the output amount in a case of control by the vehicle body controller, in which FIG. 15A illustrates the output of the load power, and FIG. 15B illustrates the output of the motor generator.

DESCRIPTION OF EMBODIMENTS

Below, embodiments of a working machine related to the present invention will be explained based on drawings.

First Embodiment

Figure 1:
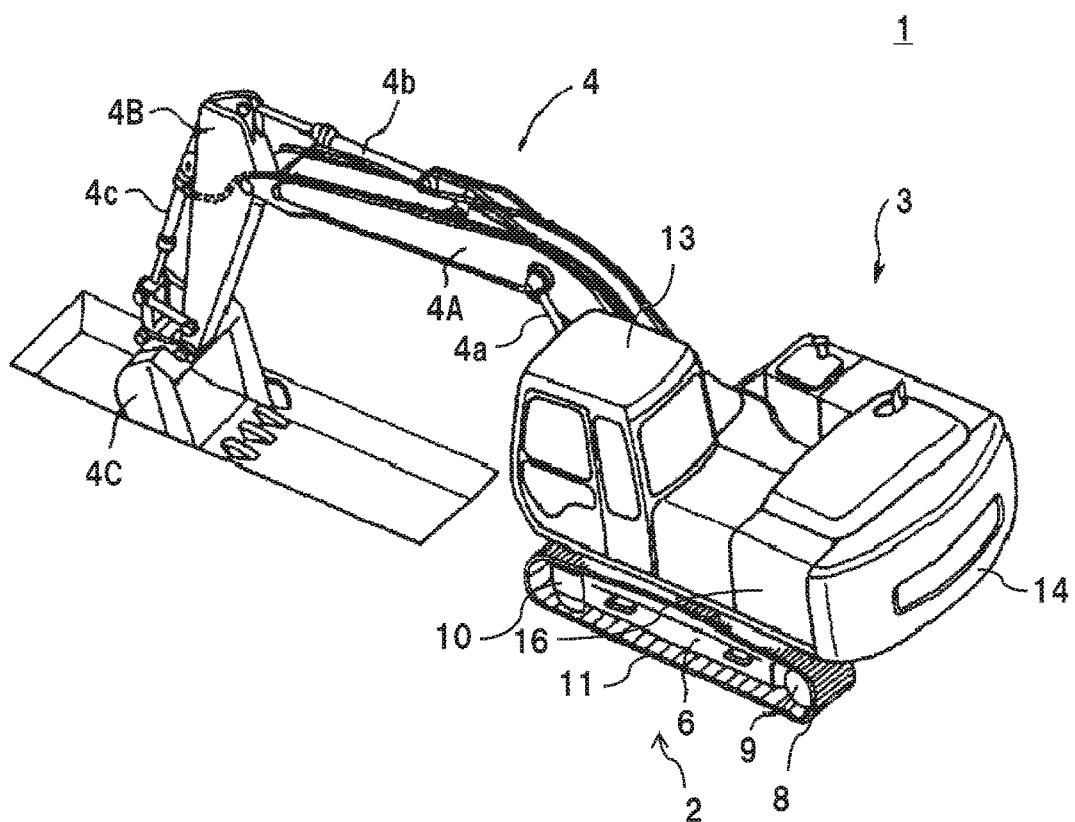
FIG. 1 is a drawing showing the outer appearance of a hybrid hydraulic excavator cited as an example of a working machine related to the present invention.

A first embodiment of a working machine related to the present invention is applied, for example, to a hybrid hydraulic excavator (hereinafter conveniently referred to as a hydraulic excavator) 1 shown in FIG. 1. The hydraulic excavator 1 includes a travel base 2, a revolving upperstructure 3 that is arranged on the travel base 2 so as to be capable of revolving through a revolving frame (not illustrated), and a front working mechanism 4 of a multi-joint type which is attached to the front of the revolving upperstructure 3, turns in the vertical direction, and executes working such as excavation.

The travel base 2 includes a truck frame 6, a revolving motor 7 (refer to FIG. 2) that is arranged in the truck frame 6 and revolves the revolving upperstructure 3, sprockets (driving wheels) 8 that are attached to one end along the front/rear direction of the truck frame 6 and are rotatively driven, traveling motors 9 that rotate the sprockets 8, idlers (idling wheels) 10 that are attached to the other end along the front/rear direction of the truck frame 6, and crawler tracks 11 that are wound around the outer periphery of the sprockets 8 and the idlers 10 in an endless shape. The travel base 2 is configured that the sprockets 8 are rotatively driven, thereby the crawler tracks 11 turn and slide against the ground surface, and the vehicle body moves.

The revolving upperstructure 3 includes a cab 13 that is arranged in the front part, a counterweight 14 that is arranged in the rear part and keeps balance of the weight of the vehicle body, an engine room 16 that is arranged in the rear part and stores an engine 15 (refer to FIG. 2) described below, the revolving motor 7, the traveling motor 9, and an actuator drive control system 17 (refer to FIG. 2) that controls drive of actuators such as a boom cylinder 4a, an arm cylinder 4b, and a bucket cylinder 4c described below.

The front working mechanism 4 is a hydraulic working device that is driven by hydraulic oil discharged by a hydraulic pump 21, and includes a boom 4A that is turnably attached to the revolving upperstructure 3 at the base end and turns in the vertical direction, an arm 4B that is turnably attached to the distal end of the boom 4A, and a bucket 4C that is turnably attached to the distal end of the arm 4B. The front working mechanism 4 includes the boom cylinder 4a that connects the revolving upperstructure 3 and the boom 4A and turns the boom 4A by expansion and shrinkage, the arm cylinder 4b that connects the boom 4A and the arm 4B and turns the arm 4B by expansion and shrinkage, and the bucket cylinder 4c that connects the arm 4B and the bucket 4C and turns the bucket 4C by expansion and shrinkage. Each motion of the boom 4A, the arm 4B, the bucket 4C, and the revolving upperstructure 3 is instructed by a hydraulic operation signal (control pilot pressure) of operating lever devices 24A, 24B described below. The motion of the travel base 2 is instructed by a hydraulic operation signal (control pilot pressure) of an operation pedal device for traveling described below.

Next, the configuration of the actuator drive control system 17 mounted on the revolving upperstructure 3 will be explained referring to FIG. 2.

Figure 2:
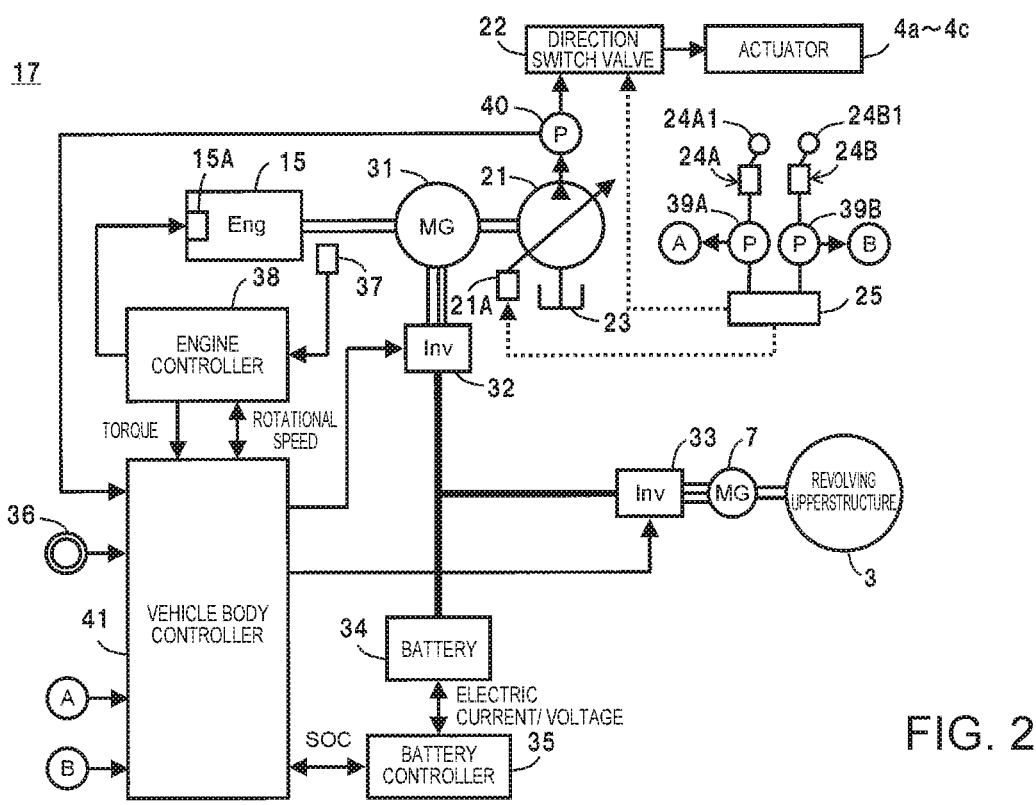
FIG. 2 is a drawing showing the configuration of a hybrid hydraulic excavator related to a first embodiment of the present invention.

As shown in FIG. 2, the actuator drive control system 17 includes the engine 15, the hydraulic pump 21 that is driven by the engine 15, a direction switch valve 22 that controls the flow of the hydraulic oil discharged by the hydraulic pump 21, a pilot pump (not illustrated) that supplies the hydraulic oil as the pilot pressure oil to the direction switch valve 22, a hydraulic oil tank 23 that stores the hydraulic oil supplied to the hydraulic pump 21 and the pilot pump, the operating lever devices 24A, 24B mounted with operating levers 24A1, 24B1 which are arranged in the cab 13, allow desired motion of the actuators 4a-4c, and are gripped and operated by an operator within the cab 13, an operation pedal device (not illustrated) mounted with operation pedals (not illustrated) which are arranged in the cab 13 and allow desired motion of the travel base 2, and on which the operator within the cab 13 steps for operation, and a shuttle valve block 25 with the inlet side being connected to the operating lever devices 24A, 24B and the operation pedal device and with the outlet side being connected to a pressure receiving chamber described below of the direction switch valve 22.

The engine 15 includes an electronic governor 15A that adjusts the fuel injection amount into each cylinder in the inside. The hydraulic pump 21 is configured of a variable displacement type hydraulic pump, for example, and includes a swash plate (not illustrated), and a regulator 21A of a positive control system in which the inclination angle of the swash plate is adjusted to control the flow rate of the discharged hydraulic oil.

The regulator 21A is connected to the shuttle valve block 25, and increases the discharge flow rate of the hydraulic pump 21 by increasing the inclination angle of the swash plate of the hydraulic pump 21 (volume) as a manipulated variable (required flow rate) of the operating levers 24A1, 24B1 which are the operation member of the operating lever devices 24A, 24B and the operation pedals of the operation pedal device increases and the hydraulic operation signal received through the shuttle valve block 25 rises. Although it is not illustrated in FIG. 2, the regulator 21A has a torque limit control function of reducing the inclination angle of the hydraulic pump 21 (volume) as the discharge pressure of the hydraulic pump 21 rises and controlling the absorption torque of the hydraulic pump 21 not to exceed the maximum torque that is set beforehand.

The direction switch valve 22 is configured of a spool valve of the open center type for example arranged in the center bypass line, and forms a hydraulic circuit between the hydraulic pump 21 and the actuators 4a to 4c. Although it is not illustrated in FIG. 2, the direction switch valve 22 includes a spool that controls the flow rate and the direction of the hydraulic oil discharged from the hydraulic pump 21 by the stroke within the housing that has the outer shell, and a pressure receiving section to which the control pilot pressure from the shuttle valve block 25 is applied to change the stroke amount of the spool.

The operating lever devices 24A, 24B and the operation pedal device reduce the primary pressure generated by the hydraulic oil discharged from the pilot pump to the secondary pressure according to the operation opening degree of the pressure reducing valve (remote control valve) provided in each device in question, and generates the control pilot pressure (hydraulic operation signal). The control pilot pressure is sent to the pressure receiving chamber of the direction switch valve 22, and operates to switch the direction switch valve 22 from the neutral position. The shuttle valve block 25 selects hydraulic operation signals other than the hydraulic operation signal that instructs the turning operation out of the hydraulic operation signals generated by the operating lever devices 24A, 24B, and a hydraulic operation signal of the highest pressure out of the hydraulic operation signals generated by the operation pedal device, and outputs them to the regulator 21A.

The actuator drive control system 17 includes a motor generator (MG) 31 that is disposed on a drive shaft (rotor shaft) of the engine 15, transmits torque between the engine 15, and thereby assists the power of the engine 15 and executes electric power generation, the revolving motor (MG) 7 that drives the revolving upperstructure 3, inverters 32, 33 that control the motion of the motor generator 31 and the revolving motor 7, a battery 34 as the electrical storage device that transmits/receives electric power between the motor generator 31 and the revolving motor 7 through the inverters 32, 33, and a battery controller 35 that controls the motion of the battery 34.

Moreover, the actuator drive control system 17 includes a target rotational speed setting part 36 that sets the target rotational speed of the engine 15, a rotational speed sensor 37 as a rotational speed detection device that detects the rotational speed of the engine 15, an engine controller 38 that is connected to the rotational speed sensor 37 and the electronic governor 15A and controls the motion of the engine 15, pressure sensors 39A, 39B as manipulated variable detection devices that detect the control pilot pressure reduced by the operating lever devices 24A, 24B and the operation pedal device, a discharge pressure sensor 40 as a discharge pressure detection device that is arranged between the hydraulic pump 21 and the direction switch valve 22 and detects the discharge pressure of the hydraulic oil discharged from the hydraulic pump 21, and a vehicle body controller 41 that is connected to the inverters 32, 33, the battery controller 35, the target rotational speed setting part 36, the engine controller 38, and the pressure sensors 39A, 39B, and controls the motion of the total vehicle body by inputting/outputting of various signals against each of these devices.

The motor generator 31 is connected to the rotor shaft of the engine 15 and the hydraulic pump 21, and has a regenerative drive function as an electric power generator that coverts the power (kinetic energy) of the engine 15 into the electric power (electric energy) and outputs the electric power to the inverter 32, and a powering drive function as an electric motor that is driven by the electric power supplied from the inverter 32, assists the power of the engine 15, and drives the hydraulic pump 21. The revolving motor 7 has a regenerative drive function of converting the power of the time of braking the revolving upperstructure 3 into the electric power and outputting the electric power to the inverter 33.

The inverter 32 is a motor generator control part that converts AC power generated by the motor generator 31 to DC power and outputs the DC power to the battery 34 when the motor generator 31 functions as an electric power generator, and coverts DC power from the battery 34 to AC power and supplies the AC power to the motor generator 31 when the motor generator 31 functions as an electric motor. The inverter 33 is a revolving motor control part that converts AC power generated by the revolving motor 7 to DC power and outputs the DC power to the battery 34 when the regenerative drive function by the revolving motor 7 works, and coverts DC power from the battery 34 to AC power and supplies the AC power to the revolving motor 7 when the powering drive function of driving the revolving upperstructure 3 by the revolving motor 7 works.

The battery 34 is inputted with a control command from the battery controller 35, supplies and discharges DC power to the inverters 32, 33 or accumulates and charges DC power supplied from the inverters 32, 33, and thereby stores the electric energy regenerated by the motor generator 31 and the electric energy regenerated by the revolving motor 7. The battery controller 35 includes an electrical storage remaining amount calculation part that detects the voltage and the current of the battery 34, estimates the amount of the electric energy stored in the battery 34, namely a so-called electrical storage remaining amount (SOC), and outputs the same to the vehicle body controller 41. The battery controller 35 calculates the electrical storage remaining amount of the battery 34 within the range of 0% to 100% based on the voltage outputted from the battery 34 and the multiplication value of the voltage and the current (electric power).

The target rotational speed setting part 36 is a target rotational speed setting dial (engine control dial) that sets the target rotational speed of the engine 15.

The engine controller 38 is inputted with the target rotational speed of the engine 15 and the actual rotational speed of the engine 15 from the vehicle body controller 41 and the rotational speed sensor 37 respectively, and calculates the deviation of the target rotational speed and the actual rotational speed. The engine controller 38 calculates the target fuel injection amount based on the calculated deviation, and outputs a control command corresponding to the target fuel injection amount to the electronic governor 15A. The electronic governor 15A works by the control command inputted from the engine controller 38, and injects and supplies the fuel that corresponds to the target fuel injection amount into each cylinder of the engine 15.

The motion of the engine 15 is controlled so as to generate the torque of the engine 15 so that the actual rotational speed of the engine 15 is kept at the target rotational speed. The engine controller 38 functions as an engine control part, and makes the engine 15 work with a governor characteristic in which the torque of the engine 15 increases with a predetermined inclination corresponding to drop of the rotational speed of the engine 15, namely the droop characteristic. As the motion control of the engine 15, the engine controller 38 executes the droop control that is in accordance with the droop characteristic.

Therefore, the target fuel injection amount to each cylinder of the engine 15 becomes 0 (zero) when the actual rotational speed of the engine 15 and the rotational speed under no load agree to each other, and increases as the actual rotational speed reduces from the target rotational speed until the torque of the engine 15 reaches the maximum torque that is determined by the specification of the engine 15. In addition, the target rotational speed is set by operation of the target rotational speed setting part 36 by the operator in accordance with the work contents and the like. The actual rotational speed changes from the rotational speed under no load up to a rotational speed generating the maximum torque in accordance with the droop characteristic according to the load of the hydraulic pump 21.

The vehicle body controller 41 includes a control calculation circuit (not illustrated) that executes calculation on control commands outputted to each device, and executes described below controls, for example, for the motor generator 31 and the revolving motor 7.

(1) Drive Control of Revolving Motor 7

The pressure sensor 39A is connected to a pilot oil passage that leads a hydraulic operation signal instructing the revolving operation of the left/right direction out of the hydraulic operation signals generated by the operating lever device 24A, and detects the hydraulic operation signal in this pilot oil passage. The vehicle body controller 41 is inputted with a detection signal (electric signal) of the pressure sensor 39A, and executes drive control of the revolving motor 7 according to the hydraulic operation signal detected by the pressure sensor 39A.

When the detection signal of the pressure sensor 39A inputted is a hydraulic operation signal instructing the revolving operation of the left direction, the vehicle body controller 41 controls the motion of the inverter 33, and executes powering control of driving the revolving motor 7 as an electric motor. Thus, the revolving motor 7 works by the electric power supplied from the inverter 33, and thereby the revolving upperstructure 3 revolves to the left at a speed corresponding to the hydraulic operation signal.

Moreover, when the detection signal of the pressure sensor 39A inputted is a hydraulic operation signal instructing the revolving operation of the right direction, the vehicle body controller 41 controls the motion of the inverter 33, and executes powering control of driving the revolving motor 7 as an electric motor. Thus, the revolving motor 7 works by the electric power supplied from the inverter 33, and thereby the revolving upperstructure 3 revolves to the right at a speed corresponding to the hydraulic operation signal.

(2) Regeneration Control of Revolving Motor 7

At the time of braking the revolving motion of the revolving upperstructure 3, the vehicle body controller 41 executes electric power generation control of controlling the motion of the inverter 33 to make the revolving motor 7 work as an electric power generator, and thereby recovers electric energy from the revolving motor 7. Moreover, the vehicle body controller 41 accumulates the recovered electric energy in the battery 34, and thereby the electrical storage remaining amount of the battery 34 increases.

(3) Motion Control of Motor Generator 31 (Electrical Storage Management Control of Battery 34)

When the absorption power of the hydraulic pump 21 namely the load of the hydraulic pump 21 is low and the electrical storage remaining amount of the battery 34 managed by the battery controller 35 is less, the vehicle body controller 41 executes electric power generation control of making the motor generator 31 work as an electric power generator with respect to the inverter 33. Thus, the motor generator 31 generates excess electric power, thereby the charging motion of the battery 34 is executed, and the electrical storage remaining amount of the battery 34 increases.

In contrast, when the absorption power of the hydraulic pump 21, namely the load of the hydraulic pump 21 is large and the electrical storage remaining amount of the battery 34 managed by the battery controller 35 is equal to or larger than a predetermined amount, the vehicle body controller 41 executes powering control of supplying the electric power of the battery 34 and making the motor generator 31 work as an electric motor with respect to the inverter 32. Thus, the motor generator 31 comes to assist the power of the engine 15, and the hydraulic pump 21 is driven by the engine 15 and the motor generator 31. Therefore, a discharging motion by the battery 34 is executed, and the electrical storage remaining amount of the battery 34 reduces.

Next, a configuration of the vehicle body controller 41 achieving the motion control of the motor generator 31 considering the electrical storage management control of the battery 34 of above (3) will be explained in detail referring to FIG. 3.

Figure 3:
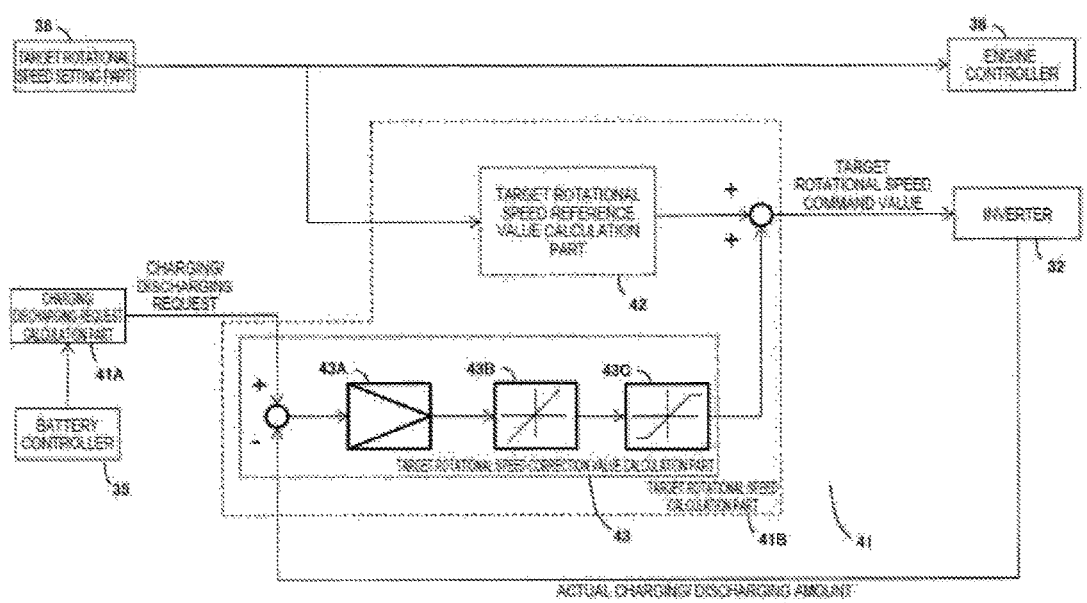
FIG. 3 is a drawing showing control on target rotational speed calculation for a vehicle body controller of FIG. 2.

As shown in FIG. 3, the vehicle body controller 41 includes a charging/discharging request calculation part 41A that calculates a charging request or a discharging request (electric power) for the battery 34, namely a charging/discharging request value, and a target rotational speed calculation part 41B that calculates a target rotational speed command value for the motor generator 31. In a case the reference value of the electrical storage remaining amount of the battery 34 is set 50% of the electrical storage capacity, for example, when the electrical storage remaining amount calculated by the electrical storage remaining amount calculation part of the battery controller 35 is larger than the reference value, the charging/discharging request calculation part 41A calculates a discharging request amount corresponding to the difference against the reference value. Moreover, when the electrical storage remaining amount calculated by the battery controller 35 is less than the reference value, the charging/discharging request calculation part 41A calculates a charging request amount corresponding to the difference against the reference value. Here, the discharging request is made positive, the charging request is made negative, and these discharging request and charging request are expressed as one power (electric power).

The target rotational speed calculation part 41B includes a target rotational speed reference value calculation part 42 and a target rotational speed correction value calculation part 43. With respect to the target rotational speed reference value calculation part 42, a rotational speed of a same value to the target rotational speed set by the target rotational speed setting part 36 is calculated as a target rotational speed reference value and is outputted. Calculation by the target rotational speed reference value calculation part 42 is similar to that of a case an output from a power rate limiter part 42A in the second embodiment described below is fixed to the maximum engine output P1.

Next, a calculation method of the target rotational speed correction value calculation part 43 will be explained.

The actual charging/discharging amount, namely the actual charging/discharging value of the battery 34 can be estimated from the output (charging/discharging amount) from the inverter 32 of the motor generator 31 relative to the charging/discharging request amount (electric power) outputted by the charging/discharging request calculation part 41A. In the battery controller 35 also, the charging/discharging amount of the battery 34 is calculated. Therefore, the target rotational speed correction value calculation part 43 uses either of the charging/discharging amount outputted from the inverter 32 or the charging/discharging amount calculated by the battery controller 35 relative to the charging/discharging request amount calculated by the charging/discharging request calculation part 41A, calculates the difference between the charging/discharging request amount and the actual charging/discharging amount, and calculates the correction rotational speed of the motor generator 31, namely the target rotational speed correction value according to the magnitude of the difference.

In concrete terms, the target rotational speed correction value calculation part 43 includes a PI control part 43A, a rotational speed rate limiter part 43B, and a rotational speed limiter part 43C. The PI control part 43A calculates the difference between the charging/discharging request amount and the actual charging/discharging amount using the PI (proportional integral) control based on a predetermined gain as the calculation of the correction rotational speed, and thereafter executes the PI control corresponding to the difference. The PI control part 43A calculates the target rotational speed correction value of the motor generator 31 so that the charging/discharging request amount and the actual charging/discharging amount agree to each other. Then, the PI control part 43A calculates a negative target rotational speed correction value corresponding to the magnitude of the difference when the calculated difference is positive (+), and calculates a positive target rotational speed correction value corresponding to the magnitude of the difference when the difference is negative (−).

The rotational speed rate limiter part 43B subjects the target rotational speed correction value calculated by the PI control part 43A to rotational speed rate limiter processing when the change rate of the target rotational speed correction value calculated before obtaining the target rotational speed correction value exceeds a predetermined upper limit value or lower limit value determined beforehand, and limits the change rate of the target obtained rotational speed correction value to obtain a target rotational speed correction value that is equivalent to the upper limit value or the lower limit value.

When the target rotational speed correction value after being subjected to the rotational speed rate limiter processing by the rotational speed rate limiter part 43B exceeds a predetermined upper limit value or lower limit value (the upper limit value of the negative target rotational speed correction value) determined beforehand, the rotational speed limiter part 43C executes limiter processing making the target rotational speed correction value the upper limit value or the lower limit value. The upper limit value and the lower limit value subjected to limiter processing by the rotational speed limiter part 43C are determined from the minimum value of the maximum rotational speed allowed by the engine 15, the hydraulic pump 21, and the motor generator 31. In the target rotational speed calculation part 41B, the target rotational speed correction value calculated by the target rotational speed correction value calculation part 43 is added to the target rotational speed reference value calculated by the target rotational speed reference value calculation part 42, and this value is outputted to the inverter 32 as a target rotational speed command value. The inverter 32 controls drive of the motor generator 31 based on the target rotational speed command value calculated by the target rotational speed calculation part 41B, and executes control of making the actual rotational speed of the motor generator 31 agree to the target rotational speed command value.

Next, a method for setting the upper limit value or the lower limit value subjected to limiter processing by the rotational speed limiter part 43C will be explained referring to FIG. 4.

Figure 4:
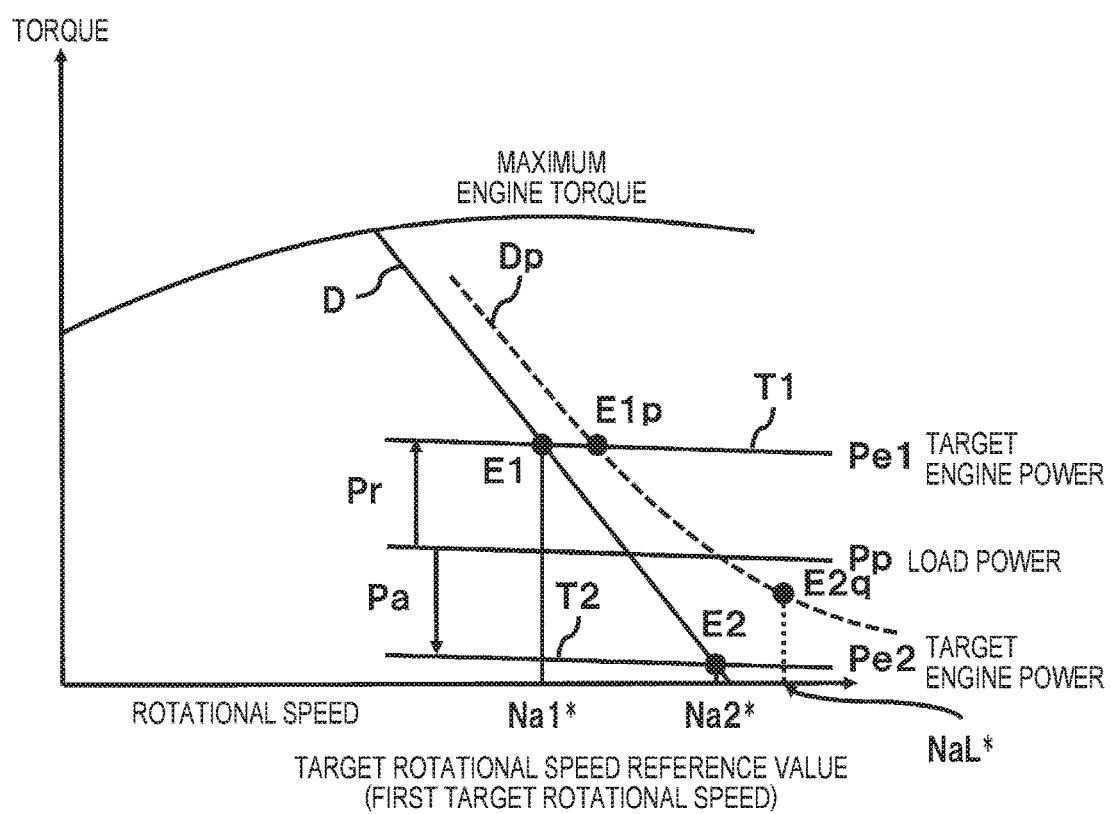
FIG. 4 is a graph showing a method for setting the upper limit value of the limiter process of the correction rotational speed by the vehicle body controller.

As shown in FIG. 4, in a case where the droop characteristic line set by the target rotational speed setting part 36 is made D and the actual droop characteristic line of the engine 15 is made Dp, when the charging request amount from the charging/discharging request calculation part 41A is Pr, a rotational speed Na1* is calculated as a target rotational speed reference value (first target rotational speed), the rotational speed Na1* being an intersection point E1 of an iso-power line T1 that conforms to a target engine power Pe1 (=Pp+Pr) and the drove characteristic line D. In actuality, although the engine 15 is operated at the intersection point of the iso-power line T1 that conforms to the target engine power Pe1 and the droop characteristic line Dp, namely a torque E1$p$, since the target engine power Pe1 is larger than a load power Pp, the battery 34 is charged by the motor generator 31, and the charging request from the charging/discharging request calculation part 41A can be conformed to.

However, when the charging request amount from the charging/discharging request calculation part 41A is Pa, if the target rotational speed reference value is to be corrected to a rotational speed (not illustrated) of the intersection point of an iso-power line T2 that conforms to a target engine power Pe2 (=Pp−Pa) and the droop characteristic line Dp, there is a risk that the rotational speed of the motor generator 31 increases excessively high as shown in FIG. 4. Therefore, the upper limit value and the lower limit value of the target rotational speed correction value are set by the rotational speed limiter part 43C, and rotational speed limiter processing is executed so that the target rotational speed command value calculated by the target rotational speed calculation part 41B does not exceed a predetermined rotational speed determined beforehand namely NaL*.

Figure 5:
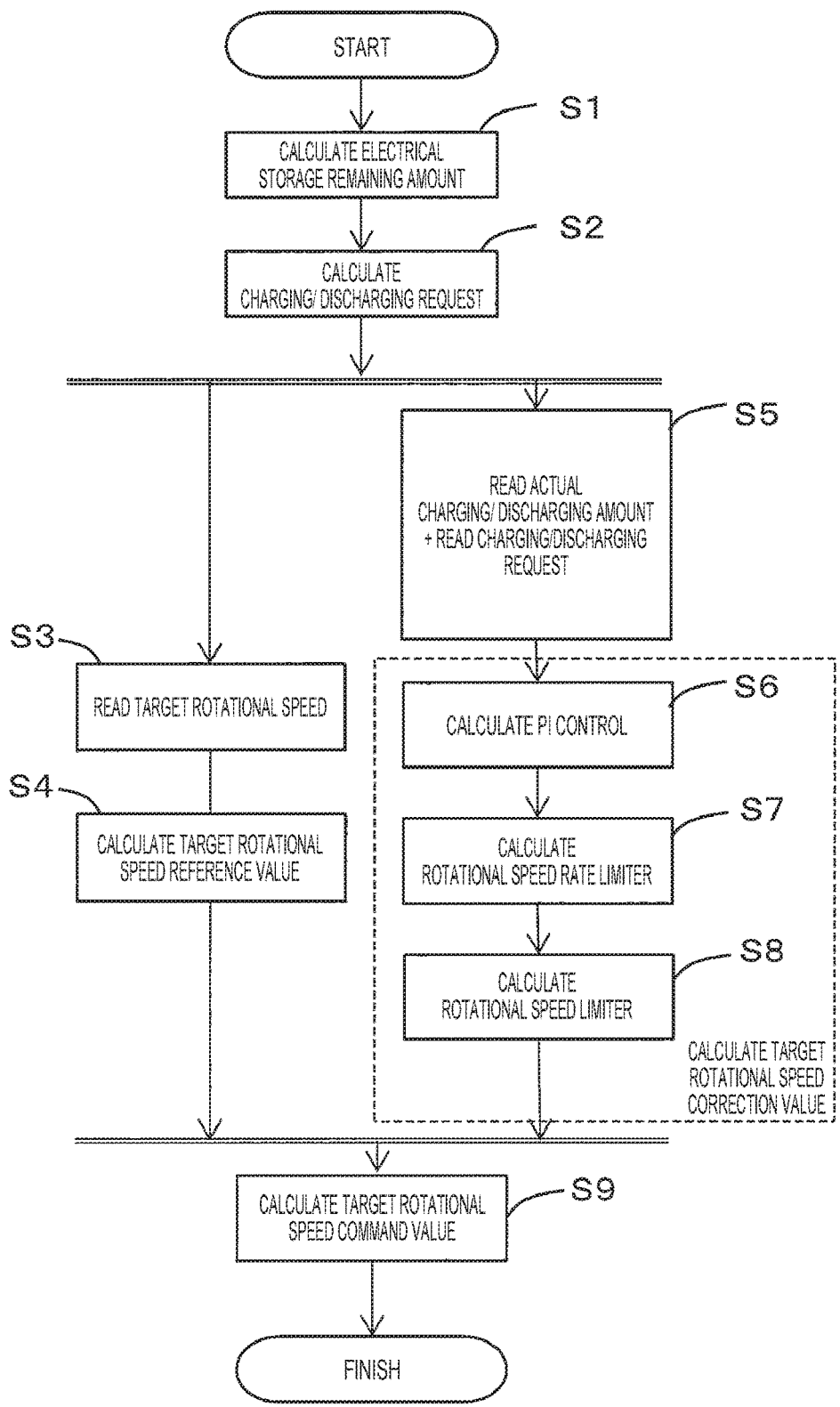
FIG. 5 is a process drawing showing the calculation process of the vehicle body controller.

Next, calculation processing of the actuator drive control system 17 related to the first embodiment described above will be explained referring to FIG. 5.

First, the electrical storage remaining amount of the battery 34 is calculated by the battery controller 35 (Step 1; will be hereinafter expressed as "S1"). Then, the information of the electrical storage remaining amount calculated by the battery controller 35 is outputted to the charging/discharging request calculation part 41A, and the charging/discharging request amount corresponding to this electrical storage remaining amount is calculated by the charging/discharging request calculation part 41A (S2).

Next, the target rotational speed set by the target rotational speed setting part 36 is read in the target rotational speed reference value calculation part 42 (S3), and a rotational speed of the same value of the target rotational speed having been read is calculated as the target rotational speed reference value and is outputted by the target rotational speed reference value calculation part 42 (S4).

In parallel with the S3 and S4, the actual charging/discharging amount of the battery 34 is read in the target rotational speed correction value calculation part 43 and the charging/discharging request amount calculated by the charging/discharging request calculation part 41A is read in the target rotational speed correction value calculation part 43 through the inverter 32 (S5). Then, the difference between these charging/discharging request amount and actual charging/discharging amount is calculated, the PI control according to this difference is executed by the PI control part 43A, and the target rotational speed correction value is calculated (S6).

Next, with respect to the target rotational speed correction value obtained in the S6, the change rate is limited by the rotational speed rate limiter part 43B (S7). With respect to this target rotational speed correction value whose change rate has been limited in S7, the upper limit value and the lower limit value are limited by the rotational speed limiter part 43C (S8).

Thereafter, calculation of adding the target rotational speed reference value obtained in the S4 and the target rotational speed correction value obtained in the S8 is executed, and the product is made a target rotational speed command value that is outputted to the inverter 32 (S9).

According to the first embodiment of the present invention configured thus, even when the target rotational speed reference value calculation part 42 may malfunction and so on and the target rotational speed reference value calculated by the target rotational speed reference value calculation part 42 may deviate from a rotational speed equivalent to the engine power that matches well with the load power of the hydraulic pump 21, cooperative control of correction to the target rotational speed command value that makes the engine power agree to the load power can be achieved by feedback control of the target rotational speed reference value using the target rotational speed correction value calculated by the target rotational speed correction value calculation part 43. Moreover, since the target rotational speed correction value calculation part 43 is configured to calculate the target rotational speed correction value of the motor generator 31 regardless of the droop control for the engine 15, even when the motion control of the engine 15 deviates from the droop characteristic, robust control can be achieved.

In other words, even when the torque of the engine 15 may deviate from the droop characteristic, the target rotational speed correction value is calculated by the target rotational speed correction value calculation part 43 of the target rotational speed calculation part 41B from the difference between the charging/discharging request value calculated by the charging/discharging request calculation part 41A and the actual charging/discharging value of the battery 34 calculated by the battery controller 35 or the inverter 32 and the target rotational speed command value of the motor generator 31 is feedback-controlled and is corrected, and therefore the electrical storage remaining amount of the battery 34 can be kept within a proper range. Accordingly, since proper management of the electrical storage remaining amount of the battery 34 becomes possible and deterioration of the workability possibly occurring when drop of the electrical storage remaining amount of the battery 34 proceeds can be prevented, sufficient workability of the hydraulic excavator 1 can be secured.

Moreover, in the target rotational speed correction value calculation part 43, it is configured that, after the PI control is executed by the PI control part 43A so that the charging/discharging request amount and the actual charging/discharging amount agree to each other and the target rotational speed correction value is calculated, this target rotational speed correction value calculated is subjected to rotational speed rate limiter processing by the rotational speed rate limiter part 43B. As a result, since sudden change of the target rotational speed correction value outputted from the target rotational speed correction value calculation part 43 can be suppressed and sudden change of the target rotational speed command value of the motor generator 31 can be prevented, sudden change of the rotational speed of the engine 15 can be prevented, and drive change of the engine 15 can be executed slowly. Accordingly, sharp speed change of the engine power accompanying sudden change of drive of the motor generator 31 can be suppressed. In particular, in the engine 15 that is controlled according to the droop characteristic, since sudden change of the engine torque can be prevented, deterioration of the fuel efficiency of the engine 15 and increase of the exhaust gas and the noise having the environmental load can be suppressed.

Further, it is configured that, when the target rotational speed correction value after being subjected to the rotational speed rate limiter processing by the rotational speed rate limiter part 43B exceeds the upper limit value or the lower limit value determined beforehand, the limiter processing is executed by the rotational speed limiter part 43C. Accordingly, even in the hydraulic excavator 1 with large change of the load of the hydraulic pump 21 accompanying a work, by arranging the upper limit value and the lower limit value, namely the limit of the absolute value of the target rotational speed correction value and suppressing the change of the target rotational speed correction value, large change of the rotational speed of the motor generator 31 can be suppressed, drive change of the engine 15 can be suppressed, and therefore overspeed of the engine 15 can be prevented.

Therefore, although the discharging request from the charging/discharging request calculation part 41A cannot be conformed with, excessive increase of the rotational speed of the motor generator 31 can be prevented, increase of the exhaust gas occurring at the time of drive change of the engine 15 can be suppressed, and generation of over-revolution and lug-down caused by excessive target rotational speed correction value can be prevented. Accordingly, damage of the drive system such as the engine 15, the hydraulic pump 21, and the motor generator 31 can be prevented, and durability of these drive systems can be improved. Further, by limiting the target rotational speed correction value by the rotational speed limiter part 43C, interference with calculation of the target rotational speed reference value in a feed-forward manner by the target rotational speed reference value calculation part 42 can be also suppressed.

Second Embodiment

Figure 6:
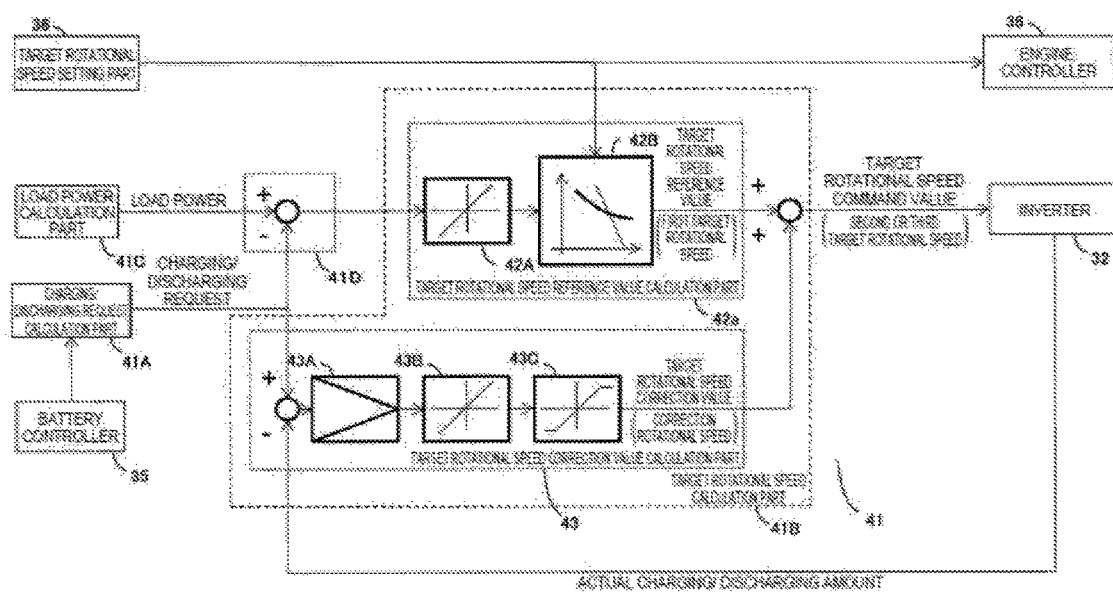
FIG. 6 is a drawing showing control on target rotational speed calculation of the vehicle body controller of a working machine related to a second embodiment of the present invention.

A second embodiment of the present invention differs from the first embodiment described above in terms that, in the first embodiment, the target rotational speed reference value calculation part 42 calculates the target rotational speed set by the target rotational speed setting part 36 as a target rotational speed reference value as shown in FIG. 3, whereas in the second embodiment, a target rotational speed reference value calculation part 42a calculates a target rotational speed reference value corresponding to the droop characteristic of the engine 15 as shown in FIG. 6.

The vehicle body controller 41 includes a load power calculation part 41C that calculates the pump power, namely the load power of the hydraulic pump 21, and a target engine power calculation part 41D that calculates the target engine power based on this load power value calculated and the charging/discharging request value calculated by the charging/discharging request calculation part 41A.

The load power calculation part 41C calculates the output of the hydraulic pump 21 based on the discharge pressure of the hydraulic oil from the hydraulic pump 21 detected by the discharge pressure sensor 40 and the pressure of the hydraulic oil estimated from the manipulated variable of the operating lever devices 24A, 24B detected by the pressure sensors 39A, 39B. The load power calculation part 41C corrects the output of the hydraulic pump 21 from the hydraulic oil efficiency or the pressure loss corresponding to the discharge pressure and the discharge flow rate of the hydraulic pump 21, calculates the absorption power of the hydraulic pump 21, and calculates this absorption power as a load power at the engine shaft.

The target engine power calculation part 41D calculates the target engine power from the difference between the load power value calculated by the load power calculation part 41C and the power value equivalent to the charging/discharging request amount calculated by the charging/discharging request calculation part 41A. Therefore, the target engine power possibly becomes negative when the load power is small and the discharging request becomes large, and possibly exceeds the maximum power of the engine 15 when each of the load power and the charging request becomes large.

Next, a calculation method of the target rotational speed reference value calculation part 42a will be explained.

The target rotational speed reference value calculation part 42a includes the power rate limiter part 42A and a droop reference part 42B. When the change rate of the target engine power calculated by the target engine power calculation part 41D relative to a target engine power calculated before calculating the target engine power exceeds the upper limit value or the lower limit value of the predetermined change rate determined beforehand, the power rate limiter part 42A executes power rate limiter processing of limitation to the upper limit value or the lower limit value, and limits the change rate of the target engine power calculated. In other words, the power rate limiter part 42A has an upper limit value or a lower limit value for the change rate of the target engine power, levels the change rate of the target engine power based on this upper limit value or lower limit value, and suppresses deterioration of the fuel efficiency accompanying sudden change of the engine torque and increase of the exhaust gas having the environmental load. The droop reference part 42B calculates the target rotational speed reference value (first target rotational speed) referring to the droop characteristic of the engine 15 shown in FIG. 7 based on the target engine power that is leveled by the power rate limiter part 42A.

The target rotational speed calculation part 41B adds the correction rotational speed calculated by the target rotational speed correction value calculation part 43 and the first target rotational speed calculated by the target rotational speed reference value calculation part 42a, and calculates the second or third target rotational speed. The second or third target rotational speed is the target rotational speed command value in the first embodiment described above, which is made the second target rotational speed when the correction rotational speed is positive, and is made the third target rotational speed when the correction rotational speed is negative. Moreover, in a case of the second target rotational speed, even when the charging/discharging request amount and the actual charging/discharging amount do not agree to each other, the upper limit value or the lower limit value is set for the magnitude of the correction rotational speed in the rotational speed limiter part 43C of the target rotational speed correction value calculation part 43, and sharp rise of the second target rotational speed is suppressed.

Next, a calculation method of the droop reference part 42B will be explained referring to FIG. 7.

Figure 7A:
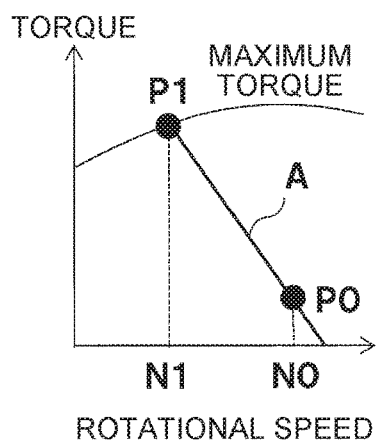

The engine 15 is subjected to drive control according to the droop characteristic in which the torque increases as the rotational speed drops as shown in FIG. 7A. FIG. 7A corresponds to that the toque becomes the maximum torque P1 that is maximum at the rotational speed N1, the rotational speed that gives the maximum torque P1 can be adjusted by that the operator operates the target rotational speed setting part 36 according to the work content and the like, and the droop characteristic line A in FIG. 7A is moved in the direction of the rotational speed. For example, in a state the droop characteristic line A shown in FIG. 7A has been selected, the engine 15 generates the maximum torque P1 at the rotational speed N1, and generates torque P0 for keeping the rotational speed in an idling state at a rotational speed N0. It is note that the rotational speed N0 is not a value exceeding the rotational speed of the engine 15 at the time of no load.

Figure 7B:
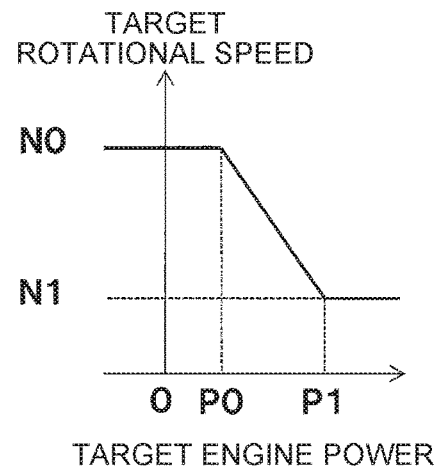

Because the target rotational speed reference value is the rotational speed corresponding to the target engine power, as shown in FIG. 7B, when the target engine power increases from P0 to P1, the target rotational speed reduces from N0 to N1 in conformity with the droop characteristic line A shown in FIG. 7A. When the target engine power is less than P0, No is made the upper limit of the target rotational speed. When the target engine power is larger than P1, since P1 is the maximum torque in the selected droop characteristic line A, N1 is made the lower limit of the target rotational speed.

Therefore, in the droop reference part 42B, the target rotational speed is calculated from the target engine power using a map showing the relationship between the target engine power and the target rotational speed shown in FIG. 7B, and calculation is executed with this calculated target rotational speed being made the target rotational speed reference value.

Figure 8:
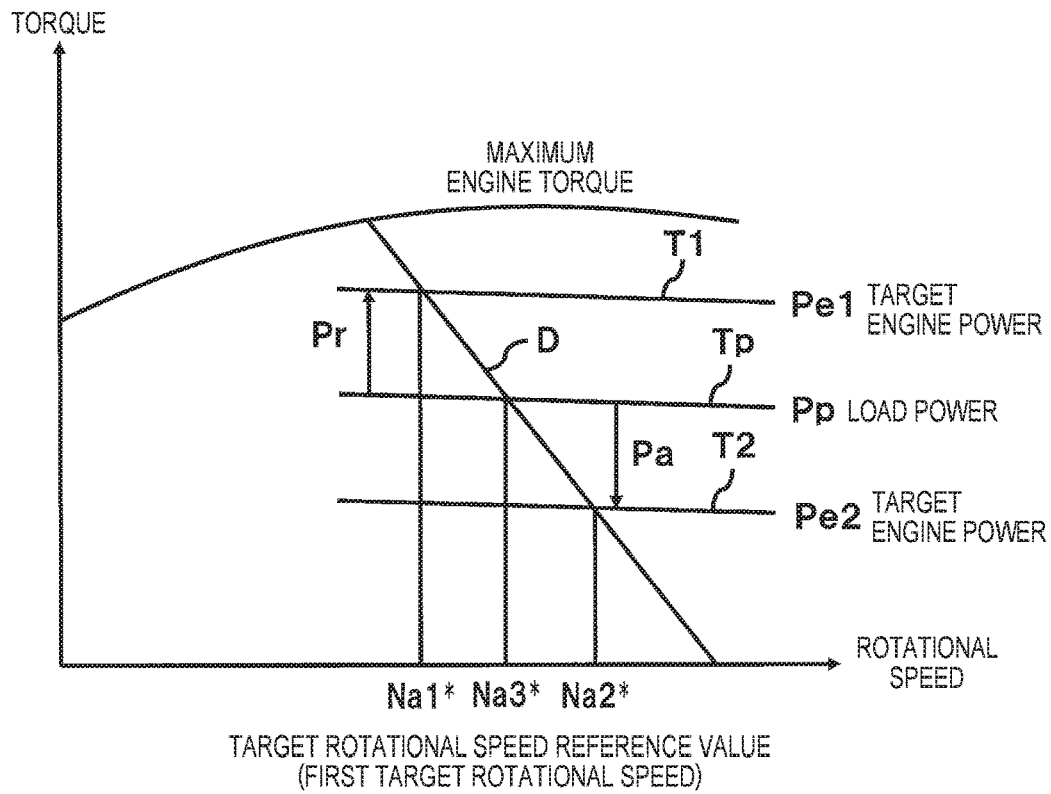
FIG. 8 is a graph showing calculation of the target rotational speed reference value calculation part of the vehicle body controller.

Further, as shown in FIG. 8, from the relationship between the rotational speed and the torque, when the droop characteristic line set by the target rotational speed setting part 36 is made D and the load power of the hydraulic pump 21 is made Pp, if the charging/discharging request amount is 0 (zero), the target rotational speed reference value calculation part 42a makes the target engine power the load power Pp and makes the rotational speed Na3* of the intersection point of the droop characteristic line D and the iso-power line Tp that conforms with the load power Pp a target rotational speed reference value, thereby the engine 15 generates the load power, the power (electric power) generated by the motor generator 31 becomes 0 (zero), and therefore the actual charging/discharging amount exactly becomes the charging/discharging request amount calculated by the charging/discharging request calculation part 41A.

Moreover, when the charging request amount is Pr, the target rotational speed reference value calculation part 42a makes the target engine power Pe1 obtained by deducting "−Pr" from Pp (Pe1=Pp+Pr), and makes the rotational speed Na1* of the intersection point of the iso-power line T1 that conforms with Pe1 and the droop characteristic line D a target rotational speed reference value. In contrast, when the charging request amount is Pa, the target engine power is made Pe2 obtained by deducting "+Pa" from Pp (Pe2=Pp−Pa), and the rotational speed Na2* of the intersection point of the iso-power line T2 that conforms with Pe2 and the droop characteristic line D is made a target rotational speed reference value. As a result, since the engine torque that conforms with the droop characteristic line D is generated, the charging/discharging request amount calculated by the charging/discharging request calculation part 41A and the actual charging/discharging amount can be made agree to each other.

Next, the calculation process of the actuator drive control system 17 related to the second embodiment described above will be explained referring to FIG. 9.

First, the electrical storage remaining amount of the battery 34 is calculated by the electrical storage remaining amount calculation part of the battery controller 35 (S1), and the charging/discharging request amount corresponding to this electrical storage remaining amount is calculated by the charging/discharging request calculation part 41A (S2). Then, in parallel with these S1 and S2, the load power of the hydraulic pump 21 is calculated by the load power calculation part 41C (S11).

Next, the difference between the load power calculated in the S11 and the charging/discharging request amount calculated in the S2 is calculated as a target engine power by the target engine power calculation part 41D (S12). With respect to this calculated target engine power, limitation of the change rate is executed by the power rate limiter part 42A (S13).

Further, the target rotational speed having been set by the target rotational speed setting part 36 is read in the target rotational speed reference value calculation part 42a (S3), and a rotational speed capable of outputting the target engine power after being limited in the S13 is calculated as a target rotational speed reference value by the droop reference part 42B based on the droop characteristic that is determined by this target rotational speed having been read (S14).

In parallel with the S12, S13, S3, and S14, the actual charging/discharging amount of the battery 34 is read in the target rotational speed correction value calculation part 43, and the charging/discharging request amount calculated by the charging/discharging request calculation part 41A is read in the target rotational speed correction value calculation part 43 (S5). Also, PI control corresponding to the difference between these charging/discharging request amount and actual charging/discharging amount is executed by the PI control part 43A (S6), limitation of the change rate by the rotational speed rate limiter part 43B is executed (S7), and limitation of the upper limit value and the lower limit value by the rotational speed limiter part 43C is executed to calculate the target rotational speed correction value (S8).

Thereafter, calculation of adding the target rotational speed reference value obtained in the S14 and the target rotational speed correction value obtained in the S8 is executed, and the result is made a target rotational speed command value (S9).

Next, the motion of the target rotational speed reference value calculation part 42a of a case the load power is not calculated correctly by the load power calculation part 41C will be explained based on FIG. 10 from the relationship between the rotational speed and the torque.

Similarly to the case shown in FIG. 8, such case is assumed that the droop characteristic line set by the target rotational speed setting part 36 is made D and the target engine power is the load power Pp. In this case, when the charging/discharging request from the charging/discharging request calculation part 41A is 0 (zero) and the load power is calculated to be Pph (>Pp) which is larger than the true load power Pp by the load power calculation part 41C, a rotational speed Na4* of the intersection point of the droop characteristic line D and the load power Pph is calculated as a target rotational speed reference value by the target rotational speed reference value calculation part 42a.

As a result, since the engine 15 is driven so as to generate the power of the load power Pph, by the power of the difference between the load power Pph of this time and the true load power Pp, namely "Pph–Pp", the motor generator 31 is driven as an electric power generator, and the electric power generated by this motor generator 31 is supplied and charged to the battery 34. When this state continues, since charging of the battery 34 is continued, the electrical storage remaining amount of the battery 34 calculated by the electrical storage remaining amount calculation part of the battery controller 35 becomes higher. When the electrical storage remaining amount of the battery 34 becomes equal to or greater than a predetermined value, a discharging request is outputted from the charging/discharging request calculation part 41A. Then, the output of the target engine power calculation part 41D becomes a value smaller than the load power Pph, and the target rotational speed reference value is calculated by the target rotational speed reference value calculation part 42a based on the load power that has become this small value. Therefore, by repetition of this motion, the target value of the engine power converges gradually to the true load power Pp.

On the other hand, when the charging/discharging request is 0 (zero) and the load power is calculated to be Ppl (<Ph) which is smaller the true load power Pp by the load power calculation part 41C, a rotational speed Na5* of the intersection point of the droop characteristic line D and the load power Ppl is calculated as a target rotational speed reference value by the target rotational speed reference value calculation part 42a. Then, since the engine 15 cannot output the power equal to or greater than the load power Ppl, the motor generator 31 is driven as a motor and assists the power of the difference between the true load power Pp and the load power Ppl, namely "Pp–Ppl", and the electric power required for driving the motor generator 31 is outputted and discharged from the battery 34.

When this state continues, since discharging of the battery 34 continues, the electrical storage remaining amount of the battery 34 calculated by the electrical storage remaining amount calculation part of the battery controller 35 becomes lower. When the electrical storage remaining amount of the battery 34 becomes lower than a predetermined value, a discharging request is outputted from the charging/discharging request calculation part 41A. Then, the output of the target engine power calculation part 41D becomes a value larger than the load power Ppl, and the target rotational speed reference value is calculated by the target rotational speed reference value calculation part 42a based on the load power that has become this large value. Therefore, by repetition of this motion, the target value of the engine power converges gradually to the true load power Pp.

As a result, utilizing the charging/discharging request of the battery 34 calculated by the target engine power calculation part 41D, a target rotational speed reference value of the engine 15 is calculated by the target rotational speed reference value calculation part 42a, drive of the motor generator 31 is controlled by the inverter 32 with the target rotational speed reference value being made a target rotational speed command value, and thereby the target rotational speed reference value can be corrected to a proper value.

Furthermore, by correction of the target rotational speed command value by the target rotational speed correction value calculation part 43 described above, converge processing of the target rotational speed command value by the target engine power calculation part 41D and the target rotational speed reference value calculation part 42a can be achieved earlier.

Figure 10:
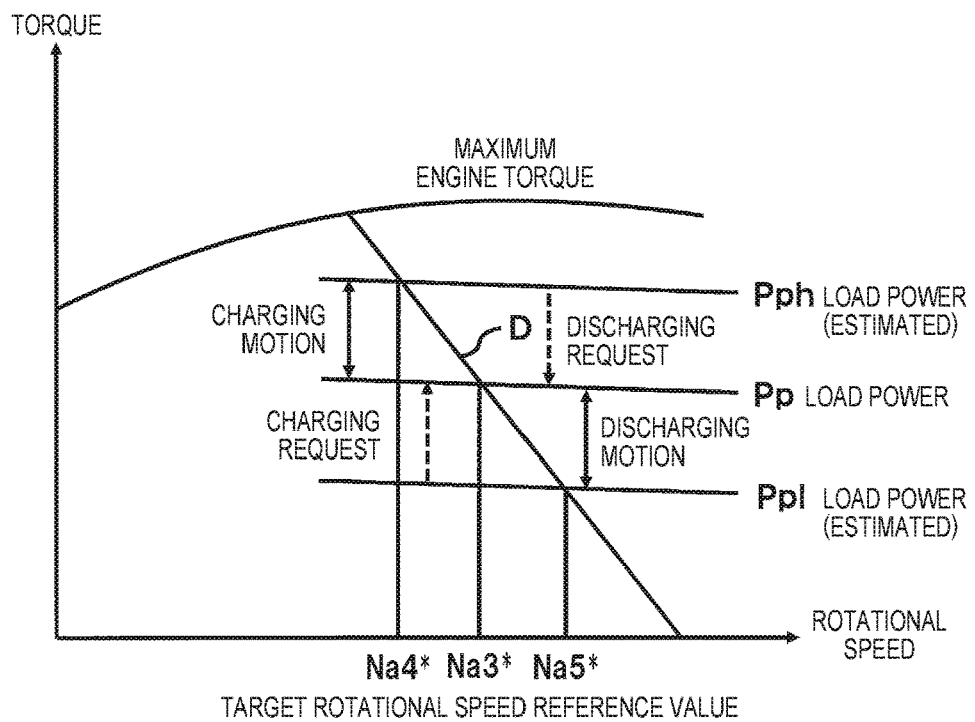
FIG. 10 is a graph showing calculation of the target rotational speed reference value calculation part of the vehicle body controller in a case where the load power is not calculated correctly.

In other words, in a state shown in FIG. 10, when the charging/discharging request from the charging/discharging request calculation part 41A is 0 (zero) and the load power is calculated to be Pph by the load power calculation part 41C, if the target rotational speed correction value is calculated to be 0 (zero) by the target rotational speed correction value calculation part 43, the target rotational speed reference value becomes Na4*, and the motor generator 31 is driven as an electric power generator by the power of "Pph–Pp" and executes charging of the battery 34. Therefore, the actual charging/discharging amount of the motor generator 31 becomes "–(Pph–Pp)".

At this time, because the charging/discharging request is 0 (zero) and the target rotational speed correction value that is proportional to a value obtained by deducting the actual charging/discharging amount "–(Pph–Pp)", namely "Pph–Pp" (>0) is calculated and outputted by the target rotational speed correction value calculation part 43, the target rotational speed command value becomes a value larger than Na4*. Accordingly, the target rotational speed command value is corrected by feedback control of the target rotational speed correction value calculated by the target rotational speed correction value calculation part 43 with respect to the target rotational speed reference value calculated by the target rotational speed reference value calculation part 42a, and therefore the target value of the engine power can be made converge to the true load power Pp earlier.

As a result, as shown in FIG. 10, in each case of calculating the load power to be larger (Pph) or smaller (Ppl) than the true load power Pp by the load power calculation part 41C, by using correction processing by the target rotational speed correction value calculation part 43, the target rotational speed command value outputted from the target rotational speed calculation part 41B can be corrected earlier. Therefore, since the target power of the engine power can be made converge to the true load power Pp more quickly, unnecessary charging/discharging of the battery 34 caused by a power estimation error of the engine 15 can be prevented more properly and effectively.

Next, a calculation method of the target rotational speed reference value calculation part 42a of a case the load power Pp calculated by the load power calculation part 41C is larger than the maximum engine output that is equivalent to the maximum engine torque will be explained referring to FIG. 11.

Figure 9:
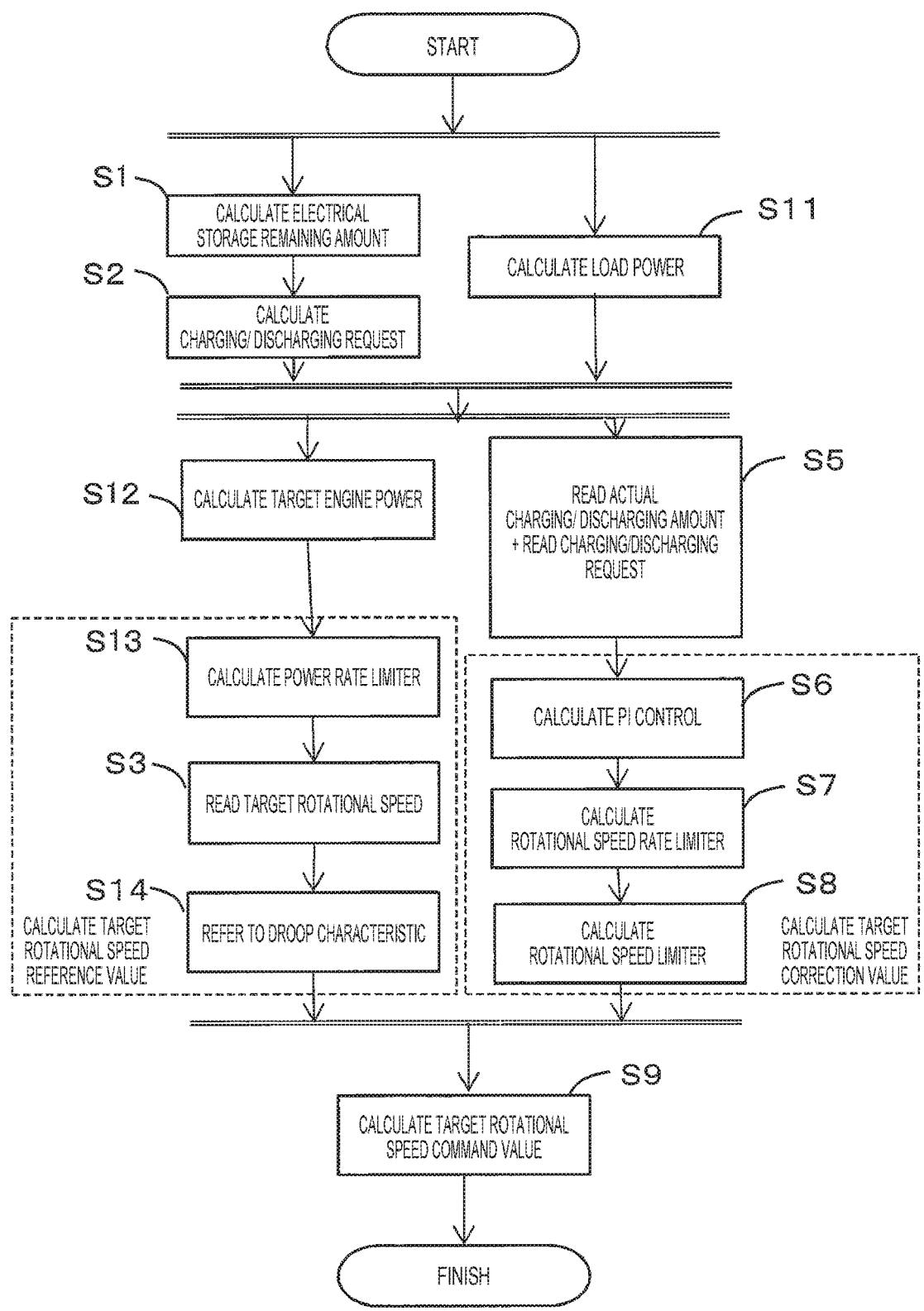
FIG. 9 is a process drawing showing the calculation process of the vehicle body controller.
Figure 11:
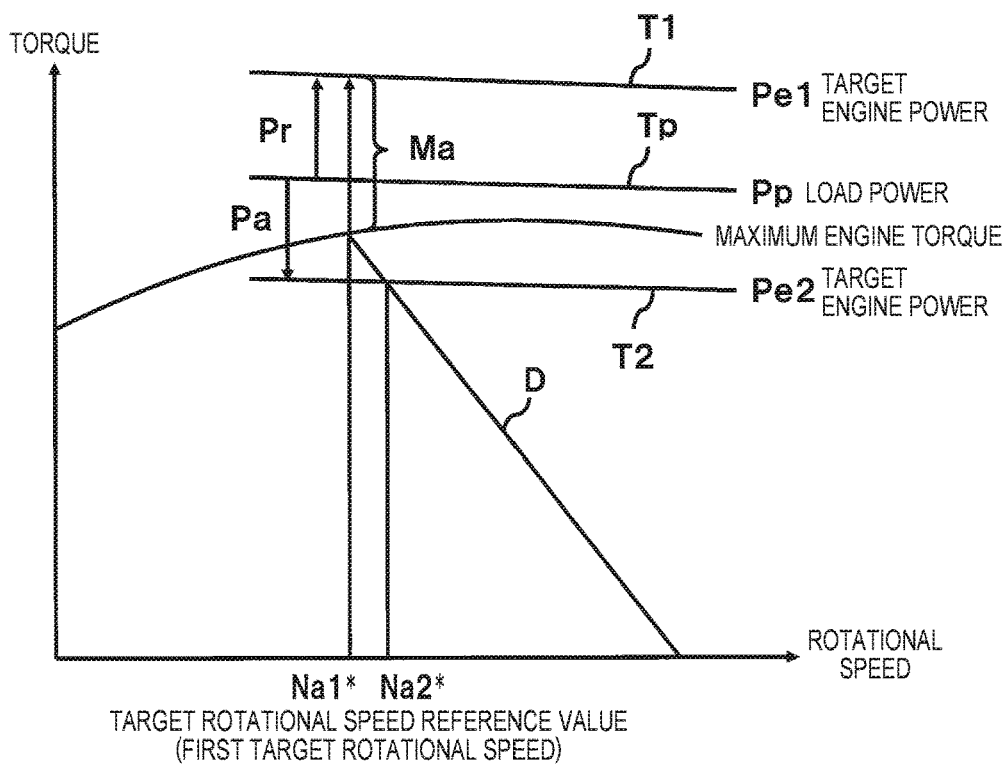
FIG. 11 is a graph showing calculation of the target rotational speed reference value calculation part in a case the load power is large.

As shown in FIG. 11, when the droop characteristic line set by the target rotational speed setting part 36 is made D and the charging/discharging request amount from the charging/discharging request calculation part 41A is 0 (zero), although the target engine power becomes the load power Pp similarly to the case shown in FIG. 9, since the load power Pp is a power exceeding the maximum engine output, the target rotational speed reference value is made Na1* that can generate the maximum engine torque. At this time, the motor generator 31 bears the power that becomes of shortage by the power of the engine 15, assists drive of the engine 15, and achieves the first target rotational speed Na1*. Therefore, in this case, even when the charging/discharging request amount from the charging/discharging request calculation part 41A is 0 (zero), discharging of the battery 34 is executed, and assistance of the engine 15 by the motor generator 31 is executed.

On the other hand, also in a case where the charging request amount from the charging/discharging request calculation part 41A is Pr, since the target engine power Pe1 (=Pp+Pr) exceeds the maximum engine output, the target rotational speed reference value is made Na1*, and the motor generator 31 assists drive of the engine 15 by a portion of the power Ma.

Further, when the discharging request amount from the charging/discharging request calculation part 41A is Pa, since the target engine power Pe2 (=Pp−Pa) does not exceed the maximum engine output, similarly to the case shown in FIG. 9, Pe2 is made a target engine power, and the rotational speed Na2* of the intersection point of the iso-power line T2 that conforms with this target engine power Pe2 and the droop characteristic line D is calculated as a target rotational speed reference value.

Next, a calculation method of the target rotational speed calculation part 41B in a case where the droop characteristic of the engine 15 changes will be explained referring to FIG. 12.

Figure 12:
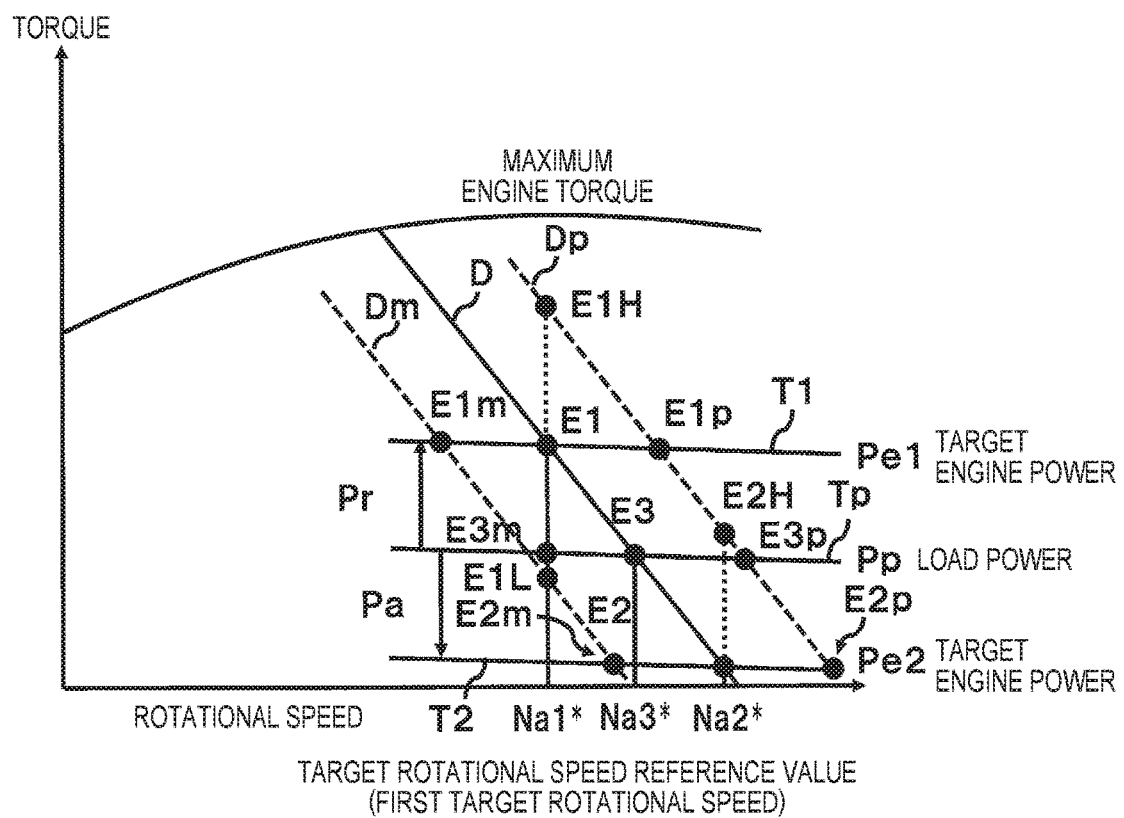
FIG. 12 is a graph showing calculation of the target rotational speed reference value calculation part in a case the droop characteristic changes.

When an ideal droop characteristic line set by the target rotational speed setting part 36 and referred to by the droop reference part 42B is made D as shown in FIG. 12, assume that the droop characteristic line changes from D to Dp or Dm by the environment and the like at the time of operation of the engine 15. In the droop characteristic line Dp, larger engine torque can be secured at a same engine rotational speed compared to the ideal droop characteristic line D, whereas in the droop characteristic line Dm, the engine torque becomes smaller at a same engine rotational speed compared to the droop characteristic line D.

In this state, when the load power is Pp and the charging request amount is Pr, the target engine power becomes Pe1 (=Pp+Pr) as shown in FIG. 12. Then, the rotational speed Na1* of the intersection point of the droop characteristic line D calculated by the target rotational speed reference value calculation part 42a and the iso-power line T1 that conforms with the target engine power Pe1 becomes a target rotational speed command value (first target rotational speed), and the engine 15 is driven (operated) by the torque E1 by controlling the motor generator 31 through the inverter 32 by this target rotational speed command value.

However, when the actual droop characteristic line is Dp, the engine 15 comes to be operated by torque E1H that is equivalent to the target rotational speed Na1*, and generates power larger than the target engine power Pe1. Therefore, the motor generator 31 executes electric power generation exceeding the charging request amount Pr, and the battery 34 is overcharged. In this case, since the actual charging amount of the battery 34 is larger than the charging request amount, by PI control by the PI control part 43A of the target rotational speed correction value calculation part 43, calculation with a positive value of the correction rotational speed (positive target rotational speed correction value), namely calculation of suppressing the charging request amount is executed. Therefore, by this calculation, the output of the target rotational speed calculation part 41B becomes the second target rotational speed that is larger than the target rotational speed reference value Na1* obtained by the target rotational speed reference value calculation part 42a.

Therefore, when the droop characteristic line referred to by the droop reference part 42B changes from D to Dp, the engine 15 comes to be operated by the torque E1p that is lower than the torque E1H, generates the target engine power Pe1, and can make the actual charging amount agree to the charging request amount Pr.

In a similar manner, in a case where the load power is Pp and the charging request amount is Pr, if the actual droop characteristic line is Dm, when operation is executed at the first target rotational speed Na1* obtained by the target rotational speed reference value calculation part 42a, the engine torque reduces to become the torque E1L, with respect to the charging request amount Pr, the motor generator 31 does not function as an electric power generator, is driven as an electric motor to assist the engine 15, and achieves the first target rotational speed. However, in this case, since the actual charging amount is less than the charging request amount Pr, by PI control by the PI control part 43A of the target rotational speed correction value calculation part 43, calculation with a positive value of the correction rotational speed (positive target rotational speed correction value), namely calculation of suppressing the charging request amount is executed. Therefore, by this calculation, the output of the target rotational speed calculation part 41B becomes the second target rotational speed that is larger than the first target rotational speed Na1* obtained by the target rotational speed reference value calculation part 42a.

Therefore, when the droop characteristic line referred to by the droop reference part 42B changes from D to Dm, the engine 15 comes to be operated by the torque E1m that is higher than the torque E1L, generates the target engine power Pe1, and can make the actual charging amount agree to the charging request amount Pr.

Moreover, in a case where the load power is Pp and the discharging request amount is Pa, if the actual droop characteristic line is Dp, when operation is executed at the first target rotational speed Na2* obtained by the target rotational speed reference value calculation part 42a, the torque of the engine 15 becomes E2H, with respect to the discharging request amount Pa, the motor generator 31 does not function as an electric motor, is driven as an electric power generator, and executes charging of the battery 34. In this case, since the actual discharging amount is less than the discharging request amount Pa, by PI control by the PI control part 43A of the target rotational speed correction value calculation part 43, calculation with a positive target rotational speed correction value, namely calculation of increasing the discharging request amount is executed. Therefore, by this calculation, the output of the target rotational speed calculation part 41B becomes the second target rotational speed that is larger than the first target rotational speed Na2* obtained by the target rotational speed reference value calculation part 42a.

Therefore, when the droop characteristic line referred to by the droop reference part 42B changes from D to Dp, the engine 15 comes to be operated by the torque E2p that is lower than the torque E2H, generates the target engine power Pe2, and can make the actual discharging amount agree to the discharging request amount Pp.

Moreover, in a case where the load power is Pp and the discharging request amount is Pa, if the actual droop characteristic line is Dm, when operation is executed at the first target rotational speed Na2* obtained by the target rotational speed reference value calculation part 42a, the engine 15 does not output torque, and becomes a motoring state in which the engine 15 is rotated by the motor generator 31. In this case, since the actual discharging amount is larger than the discharging request amount Pa, by PI control by the PI control part 43A of the target rotational speed correction value calculation part 43, calculation with a negative value of the correction rotational speed (negative target rotational speed correction value), namely calculation of suppressing the discharging request amount is executed. Therefore, by this calculation, the output of the target rotational speed calculation part 41B becomes the third target rotational speed that is smaller than the first target rotational speed Na2* obtained by the target rotational speed reference value calculation part 42a.

Therefore, when the droop characteristic line referred to by the droop reference part 42B changes from D to Dm, the engine 15 comes to be operated by the torque E2m, generates the target engine power Pe2, and can make the actual discharging amount agree to the discharging request amount Pp.

Further, in a case where the load power is Pp and the charging/discharging request amount is 0 (zero), when the actual droop characteristic line is Dp, the engine 15 is operated at the intersection point of the iso-power line Tp that conforms with the load power Pp and the droop characteristic line Dp, namely the torque E3p. Further, in this case, when the actual droop characteristic line is Dm, the engine 15 is operated at the intersection point of the iso-power line Tp that conforms with the load power Pp and the droop characteristic line Dm, namely the torque E3m. Therefore, in both cases, by correcting the first target rotational speed based on the first target rotational speed Na3* that is the intersection point of the iso-power line Tp that conforms with the load power Pp and the droop characteristic line D, the charging/discharging request of the battery 34 can be fulfilled.

Next, a calculation method of the target rotational speed calculation part 41B of a case any of the pressure sensors 39A, 39B and the discharge pressure sensor 40 is damaged and so on and abnormality occurs will be explained.

When any of the pressure sensors 39A, 39B and the discharge pressure sensor 40 is damaged and so on and abnormality occurs, although the load power cannot be calculated by the load power calculation part 41C, the target rotational speed is calculated by the target rotational speed calculation part 41B using the charging/discharging request amount calculated by the charging/discharging request calculation part 41A.

In other words, when the load power increases, since the target rotational speed of the motor generator 31 does not change immediately, control is executed so that the motor generator 31 executes powering, the engine torque is made constant, and the rotational speed of the hydraulic pump 21 does not drop. At this time, when there is a charging request from the charging/discharging request calculation part 41A, since the motor generator 31 is made power run and the battery 34 is discharged, by PI control by the PI control part 43A of the target rotational speed correction value calculation part 43, the correction rotational speed reduces, and the third target rotational speed also reduces. Further, since the battery 34 is discharged, the electrical storage remaining amount of the battery 34 gradually reduces, the charging request amount from the charging/discharging request calculation part 41A increases, and the first target rotational speed calculated by the target rotational speed reference value calculation part 42a also reduces. As a result, the rotational speed of the engine 15 drops, and larger torque is generated.

Further, also in a case where the load power reduces, since the target rotational speed of the motor generator 31 does not change immediately, control is executed so that the motor generator 31 is regenerated, the engine torque is made constant, and the rotational speed of the hydraulic pump 21 does not increase. At this time, when there is a charging request from the charging/discharging request calculation part 41A, since the motor generator 31 is regenerated and the battery 34 is charged, by PI control by the PI control part 43A of the target rotational speed correction value calculation part 43, the correction rotational speed increases, and the third target rotational speed also increases. Further, since the battery 34 is charged, the electrical storage remaining amount of the battery 34 gradually increases, the charging request amount from the charging/discharging request calculation part 41A reduces, and the first target rotational speed calculated by the target rotational speed reference value calculation part 42a also increases. As a result, the rotational speed of the engine 15 increases, and the engine torque is suppressed.

By the above, in both cases of increase and reduction of the load power, even when calculation of the load power by the load power calculation part 41C cannot be executed, by PI control by the PI control part 43A of the target rotational speed correction value calculation part 43, calculation of the target engine power by the target engine power calculation part 41D can be substituted by the charging/discharging request amount calculated by the charging/discharging request calculation part 41A, and the actual charging/discharging amount can be made agree to the charging/discharging request amount outputted from the charging/discharging request calculation part 41A.

Accordingly, since the engine torque can be increased and reduced according to the load power, even when the load power calculated by the load power calculation part 41C deviates from an actual value, the engine power can be controlled properly and quickly. As a result, almost similar motion can be secured as the hydraulic excavator 1, the operability can be secured without providing a sense of discomfort to an operator, and therefore deterioration of the workability of the hydraulic excavator 1 can be suppressed.

However, when the charging/discharging amount and the electrical storage remaining amount of the battery 34 change, the target rotational speed of the motor generator 31 changes, therefore the electric power amount of charging or discharging of the battery 34 and the frequency thereof tend to increase compared to a case of using the load power calculated by the load power calculation part 41C, and there are risks that the fuel efficiency of the engine 15 is deteriorated and the service life of the battery 34 is reduced.

Therefore, when each of the pressure sensors 39A, 39B and the discharge pressure sensor 40 functions normally, the sum of the load power and the charging/discharging request amount is calculated and is calculated in a feed-forward manner to be made a target engine power by the target engine power calculation part 41D, and the engine power is controlled to a proper operation point before the target rotational speed correction value increases. In other words, the time the target rotational speed correction value calculated by the target rotational speed correction value calculation part 43 increases is the time when deviation of the actual charging/discharging amount of the battery 34 and the charging/discharging request amount increases, namely a case discharging or charging from the battery 34 becomes excessively large, and the service life of the battery 34 has a correlative relationship with the charging/discharging amount. Therefore, by switching the system so that the charging/discharging amount is made the target engine power only when any of the pressure sensors 39A, 39B and the discharge pressure sensor 40 is damaged, deterioration of the fuel efficiency of the engine 15 and reduction of the service life of the battery 34 can be prevented as much as possible.

Third Embodiment

Figure 13:
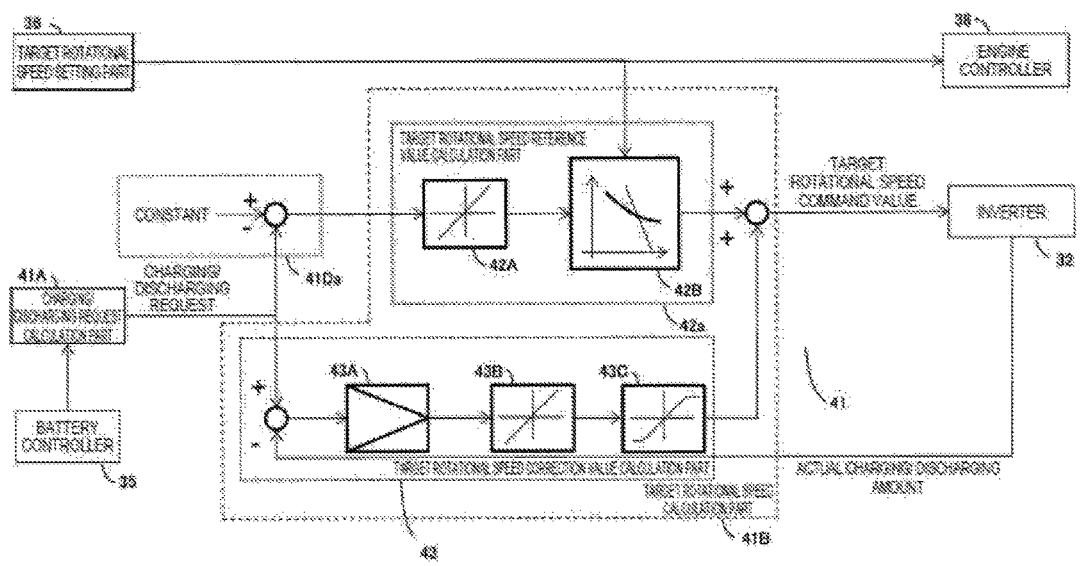
FIG. 13 is a drawing showing control on target rotational speed calculation of the vehicle body controller of a working machine related to a third embodiment of the present invention.

A third embodiment of the present invention differs from the second embodiment described above in terms that, in the second embodiment, the target engine power calculation part 41D calculates the target engine power based on the load power calculated by the load power calculation part 41C as shown in FIG. 6, whereas in the third embodiment, a target engine power calculation part 41Da calculates the target engine power from an optional constant as shown in FIG. 13.

The constant used by the target engine power calculation part 41Da is one used as an alternative signal of the load power calculated by the load power calculation part 41C related to the second embodiment described above, and is set within a range from the minimum value to the maximum value of this load power. The target engine power calculation part 41Da calculates a target rotational speed command value so that the engine power agrees to the actual value of the load power in a steady state. Therefore, in the present third embodiment, the target rotational speed command value can be calculated without using load power information calculated by the load power calculation part 41C. Therefore, even when the load power calculated by the load power calculation part 41C and the value (true value) of the actual load power deviate from each other, the target rotational speed command value can be calculated, and the engine power can be properly controlled.

Figure 14:
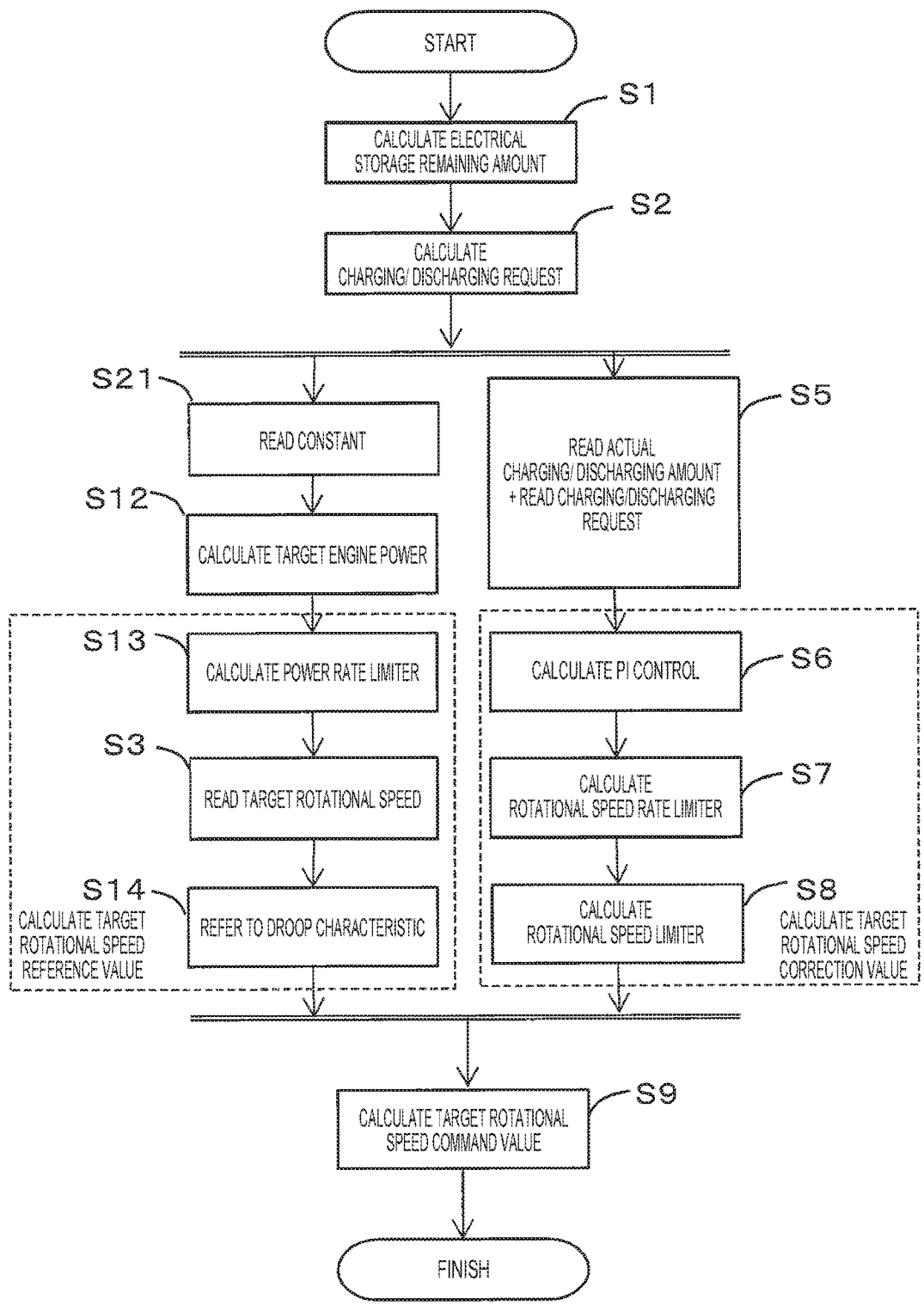
FIG. 14 is a process drawing showing a calculation process of the vehicle body controller.

Next, a calculation process of the actuator drive control system 17 related to the third embodiment described above will be explained referring to FIG. 14.

First, the electrical storage remaining amount of the battery 34 is calculated (S1), and the charging/discharging request amount corresponding to this electrical storage remaining amount is calculated (S2).

Next, a predetermined constant is read in the target engine power calculation part 41Da (S21), and the target engine power is calculated from the difference between this constant and the charging/discharging request amount calculated in the S2 (S12). Thereafter, with respect to this target engine power, limitation of the change rate is executed (S13).

Furthermore, the target rotational speed set by the target rotational speed setting part 36 is read (S3), and the target rotational speed reference value is calculated based on the droop characteristic that is determined by this target rotational speed (S14).

In parallel with the S21, S12, S13, S3, and S14, the actual charging/discharging amount of the battery 34 and the charging/discharging request amount calculated in the S2 are read (S5), PI control corresponding to the difference between these charging/discharging request amount and actual charging/discharging amount (S6), limitation of the change rate (S7), and limitation of the upper limit value and the lower limit value are executed, and the target rotational speed correction value is calculated (S8).

Thereafter, the target rotational speed reference value obtained in the S14 and the target rotational speed correction value obtained in the S8 are added, and the target rotational speed command value is calculated (S9).

Figure 15A:
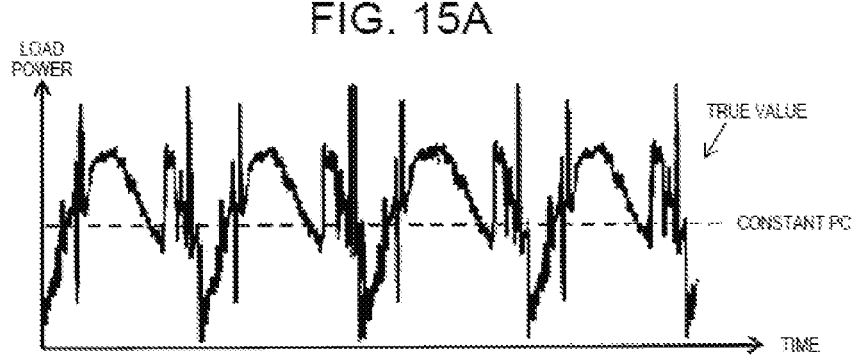

Here, in the hydraulic excavator 1, the load power during work changes as the time passes as shown in FIG. 15A. Therefore, when the constant used by the target engine power calculation part 41Da is fixed to a constant value, a value PC for example, a deviation occurs between the target engine power value calculated from the actual value (true value) of the load power and the target engine power value calculated by the target engine power calculation part 41Da.

Figure 15B:
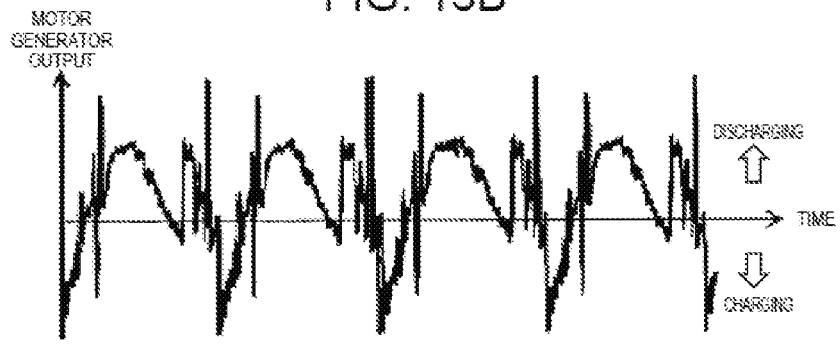

In other words, when the charging/discharging request amount outputted from the charging/discharging request calculation part 41A is 0 (zero), since the target engine power calculated by the target engine power calculation part 41Da becomes the constant PC, the difference between the true value of the load power and the constant PC comes to be outputted to the motor generator 31 as shown in FIG. 15B, the motor generator 31 functions as an electric motor and discharging of the battery 34 is executed when the output to the motor generator 31 is positive, and the motor generator 31 functions as an electric power generator and charging of the battery 34 is executed when the output to the motor generator 31 is negative. In contrast, since the period over which the battery 34 can be used properly, namely the service life, has a correlative relationship with the charging/discharging amount of the battery 34, in order to prevent deterioration of the service life of the battery 34, it is preferable to quickly eliminate the difference between the true value of the load power and the engine power.

Furthermore, in order to make the engine power quickly agree to the true value of the load power, it is necessary to be more increased the correction amount of the target rotational speed correction value by the target rotational speed correction value calculation part 43. This correction amount can be increased by execution of at least one or more out of (1) to increase the gain at the time of PI control by the PI control part 43A, (2) to increase the change rate in the rotational speed rate limiter part 43B, and (3) to increase the upper limit value and the lower limit value in the rotational speed limiter part 43C.

However, when processing for making the engine power quickly agree to the true value of the load power as described above is executed in a case the load power value calculated by the load power calculation part 41C can be utilized as a correct value, there is a case that a feed-forward action by the target rotational speed reference value calculation part 42a of executing calculation based on the charging/discharging request amount outputted from the charging/discharging request calculation part 41A and a feed-forward action by the target rotational speed correction value calculation part 43 of executing calculation considering the actual charging/discharging amount interfere with each other, and the target rotational speed correction value periodically repeats increase and decrease, namely changes like a vibration, the target rotational speed command value being obtained by correction of the target rotational speed reference value by the target rotational speed correction value, the target rotational speed reference value being calculated by the target rotational speed reference value calculation part 42a, the target rotational speed correction value being calculated by the target rotational speed correction value calculation part 43.

Therefore, when abnormality such as the damage of any of the pressure sensors 39A, 39B and the discharge pressure sensor 40 has not been detected, any of the gain at the time of PI control by the PI control part 43A of the target rotational speed correction value calculation part 43, the change rate in the rotational speed rate limiter part 43B, and the upper limit value and the lower limit value in the rotational speed limiter part 43C is not changed and is made a normal design value, and, only when abnormality such as the damage of at least any of these pressure sensors 39A, 39B and discharge pressure sensor 40 has been detected, the gain at the time of PI control by the PI control part 43A is increased, the change rate in the rotational speed rate limiter part 43B is increased, and the upper limit value and the lower limit value in the rotational speed limiter part 43C are increased so that the correction value of the target rotational speed correction value by the target rotational speed correction value calculation part 43 becomes larger than that of a case abnormality such as the damage of at least any of these pressure sensors 39A, 39B and discharge pressure sensor 40 has not been detected. As a result, since the periodical change of the target rotational speed command value described above can be prevented, deterioration of the service life of the battery 34 can be prevented.

[Others]

In addition, the present invention is not limited to the embodiments described above, and various modifications are included therein. For example, the embodiments described above were explained to facilitate understanding of the present invention, and the present invention is not necessarily limited to those including all configurations explained.

Although explanation was made for a case of the hydraulic excavator 1 in each embodiment described above, the present invention is not limited to the case, and working machines such as a hybrid wheel loader and a crane are also applicable.

Further, in each embodiment described above, although the target rotational speed correction value calculation part 43 executed processing in the order of the PI control part 43A, the rotational speed rate limiter part 43B, and the rotational speed limiter part 43C, it is also possible to reverse the order of the rotational speed rate limiter part 43B and the rotational speed limiter part 43C, and to eliminate these rotational speed rate limiter part 43B and rotational speed limiter part 43C as the case may be. Also, in a similar manner, the power rate limiter part 42A of the target rotational speed reference value calculation part 42a in the second embodiment and the third embodiment described above also may be eliminated as the case may be.

Further, in the second embodiment described above, when the deviation of the droop characteristic referred to by the droop reference part 42B and the droop characteristic of the actual engine 15 is small, since the inclination of the droop characteristic line can be expressed by the dimension of (Nm/rpm), the physical meaning of the change amount (kW/s) of the target engine power in the power rate limiter part 42A of the target rotational speed reference value calculation part 42a and the change amount (rpm/s) in the rotational speed rate limiter part 43B of the target rotational speed correction value calculation part 43 can be designed in a same degree. For example, when the inclination of the droop characteristic is A (Nm/rpm) and the rotational speed providing the maximum torque in the target rotational speed setting part 36 is set at N1 (rpm), utilizing the constant $C=1,000\times(60/2\pi)$ that is for part conversion, conversion is effected using (the upper limit value (set value) by the rotational speed rate limiter part 43B)=((the upper limit value (set value) by the power rate limiter part 42A)/N1× C)/A.

REFERENCE SIGNS LIST

1 . . . Hydraulic excavator (working machine)
4 . . . Front working mechanism (hydraulic working unit)
15 . . . Engine
21 . . . Hydraulic pump
24A, 24B . . . Operating lever device (operation device)
31 . . . Motor generator
32 . . . Inverter (motor generator control part)
34 . . . Battery (electrical storage device)
35 . . . Battery controller (electrical storage remaining amount calculation part)
38 . . . Engine controller (controller)
39A, 39B . . . Pressure sensor (manipulated variable detection device)
40 . . . Discharge pressure sensor (discharge pressure detection device)
41 . . . Vehicle body controller (controller)
41A . . . Charging/discharging request calculation part
41B . . . Target rotational speed calculation part
41C . . . Load power calculation part
41D, 41Da . . . Target engine power calculation part

The invention claimed is:

1. A working machine, comprising:
an engine;
a hydraulic pump that is driven by the engine;
a hydraulic working unit that is driven by hydraulic oil discharged by the hydraulic pump;
a motor generator that effects transmission of torque to/from the engine;
an electrical storage device that transmits/receives electric power to/from the motor generator; and
a controller that operates the engine with a droop characteristic in which torque of the engine increases at a predetermined inclination corresponding to drop of rotational speed of the engine,
wherein the controller includes:
an electrical storage remaining amount calculation part that calculates an electrical storage remaining amount of the electrical storage device;
a charging/discharging request calculation part that calculates a charging/discharging request value for maintaining electric power outputted by the electrical storage device within a predetermined range based on the electrical storage remaining amount calculated by the electrical storage remaining amount calculation part;
a target rotational speed calculation part that calculates a target rotational speed command value for the motor generator; and
a motor generator control part that controls the motor generator according to the target rotational speed command value calculated by the target rotational speed calculation part,
at least one of the electrical storage remaining amount calculation part and the motor generator control part calculates an actual charging/discharging value of the electrical storage device, and
the target rotational speed calculation part calculates a target rotational speed correction value from difference between the charging/discharging request value and the actual charging/discharging value and corrects the target rotational speed command value.

2. The working machine according to claim 1, wherein the target rotational speed calculation part has an upper limit value of a change rate of the target rotational speed correction value.

3. The working machine according to claim 1, wherein the target rotational speed calculation part has an upper limit value and a lower limit value of the target rotational speed correction value.

4. The working machine according to claim 1,
wherein the controller comprises a target engine power calculation part that calculates target engine power of the engine based on the charging/discharging request value, and the target rotational speed calculation part:
- calculates rotational speed of an intersection point of a droop characteristic line that expresses relationship between rotational speed and torque of the engine and an iso-power line that conforms with the target engine power as a first target rotational speed for the motor generator;
- calculates a second target rotational speed larger than the first target rotational speed as the target rotational speed command value when the actual charging value is larger than the charging request value or the actual discharging value is smaller than the discharging request value; and
- calculates a third target rotational speed smaller than the first target rotational speed as the target rotational speed command value when the actual charging value is smaller than the charging request value or the actual discharging value is larger than the discharging request value.

5. The working machine according to claim 4,
wherein the controller comprises a load power calculation part that calculates load power of the engine, and the target engine power calculation part calculates the target engine power based on the charging/discharging request value and the load power value.

6. The working machine according to claim 4, wherein the target rotational speed calculation part has an upper limit value of a change rate of the target engine power.

7. The working machine according to claim 5, further comprising:
- an operation device for operating the hydraulic working unit;
- a discharge pressure detection device for detecting discharge pressure of the hydraulic pump; and
- a manipulated variable detection device for detecting a manipulated variable of the operation device,
wherein the target engine power calculation part calculates the target engine power based on the charging/discharging request value when abnormality occurs in a detection value of at least one of the discharge pressure detection device and the manipulated variable detection device.

8. The working machine according to claim 7, wherein the target rotational speed calculation part increases the target rotational speed correction value when abnormality occurs in a detection value of at least one of the discharge pressure detection device and the manipulated variable detection device compared to a case abnormality does not occur in the detection value.

* * * * *